(12) United States Patent
Wada et al.

(10) Patent No.: US 12,297,318 B2
(45) Date of Patent: May 13, 2025

(54) CURABLE RESIN COMPOSITION

(71) Applicant: CANON KABUSHIKI KAISHA, Tokyo (JP)

(72) Inventors: Kyohei Wada, Kawasaki (JP); Chiaki Nishiura, Tokyo (JP); Ryo Ogawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/351,831

(22) Filed: Jul. 13, 2023

(65) Prior Publication Data

US 2023/0357488 A1 Nov. 9, 2023

Related U.S. Application Data

(62) Division of application No. 16/211,419, filed on Dec. 6, 2018, now abandoned.

(30) Foreign Application Priority Data

| Dec. 13, 2017 | (JP) | 2017-238733 |
| Dec. 13, 2017 | (JP) | 2017-238734 |
| Dec. 13, 2017 | (JP) | 2017-238735 |
| Nov. 29, 2018 | (JP) | 2018-223323 |
| Nov. 29, 2018 | (JP) | 2018-223324 |

(51) Int. Cl.
| C08G 59/38 | (2006.01) |
| B29C 64/30 | (2017.01) |
| B33Y 70/00 | (2020.01) |
| C08G 59/32 | (2006.01) |
| C08G 59/36 | (2006.01) |
| C08G 59/40 | (2006.01) |
| C08G 65/18 | (2006.01) |
| C08G 65/22 | (2006.01) |
| B29C 64/106 | (2017.01) |
| B29K 63/00 | (2006.01) |
| B33Y 10/00 | (2015.01) |

(52) U.S. Cl.
CPC .............. *C08G 59/38* (2013.01); *B29C 64/30* (2017.08); *B33Y 70/00* (2014.12); *C08G 59/3245* (2013.01); *C08G 59/36* (2013.01); *C08G 59/4064* (2013.01); *C08G 65/18* (2013.01); *C08G 65/22* (2013.01); *B29C 64/106* (2017.08); *B29K 2063/00* (2013.01); *B33Y 10/00* (2014.12)

(58) Field of Classification Search
CPC .................................................... C08G 59/38
See application file for complete search history.

(56) References Cited

U.S. PATENT DOCUMENTS

| 8,532,442 B2 | 9/2013 | Kondou et al. |
| 8,755,410 B2 | 6/2014 | Todo et al. |
| 8,867,885 B2 | 10/2014 | Hirayama |
| 9,075,303 B2 | 7/2015 | Hirayama |
| 9,416,220 B2 | 8/2016 | Ogane et al. |
| 10,288,770 B2 | 5/2019 | Hirayama et al. |
| 10,662,278 B2 | 5/2020 | Okamoto et al. |
| 2002/0132872 A1 | 9/2002 | Yamamura et al. |
| 2002/0161068 A1 | 10/2002 | Watanabe et al. |
| 2005/0159581 A1 | 7/2005 | Vanderzande et al. |
| 2005/0171255 A1 | 8/2005 | Yamamura et al. |
| 2005/0238299 A1 | 10/2005 | Takahashi |
| 2006/0009547 A1 | 1/2006 | Maeshima et al. |
| 2006/0017459 A1 | 1/2006 | Kanno et al. |
| 2007/0004816 A1 | 1/2007 | Yashiro et al. |
| 2007/0043138 A1 | 2/2007 | Yamamura et al. |
| 2009/0233094 A1 | 9/2009 | Yokoe |
| 2010/0196689 A1 | 8/2010 | Fujii et al. |
| 2013/0012618 A1 | 1/2013 | Hiro et al. |
| 2013/0236149 A1 | 9/2013 | Hirayama |
| 2016/0342085 A1* | 11/2016 | Sakai ................... G03F 7/0043 |
| 2017/0023859 A1 | 1/2017 | Tsutsumi |
| 2018/0273722 A1 | 9/2018 | Tsutsumi et al. |
| 2019/0049841 A1 | 2/2019 | Okamoto et al. |
| 2020/0055979 A1 | 2/2020 | Miyake et al. |

FOREIGN PATENT DOCUMENTS

| JP | 60-247515 A | 12/1985 |
| JP | 11-140171 A | 5/1999 |
| JP | 2000-302964 A | 10/2000 |
| JP | 2005-053936 A | 3/2005 |
| JP | 2005-281414 A | 10/2005 |
| JP | 2006-33579 A | 2/2006 |
| JP | 2006-335796 A | 12/2006 |
| JP | 2008-184563 A | 8/2008 |

(Continued)

OTHER PUBLICATIONS

Notice of Reasons for Refusal in Japanese Application No. 2017-238735 (Oct. 2021).
Notice of Reasons for Refusal in Japanese Application No. 2018-223323 (Sep. 2022).
Notice of Reasons for Refusal in Japanese Application No. 2018-223324 (Sep. 2022).
Ullmann's "Polymers and Plastics: Products and Processes," vol. 4, p. 1648 (2016).
Takahiro Okamatsu et al., "Thermodynamic Work of Adhesion and Peel Adhesion Energy of Dimethoxysilyl-Terminated Polypropylene Oxide/Epoxy Resin System Jointed with Polymeric Substrates" 80 J. Appl. Polymer Sci. 1920-1930 (Mar. 2001).
WO 2017/141935, 2019/0049841 A1.
JP 2011-146928, U.S. Pat. No. 8,755,410, B2.
JP 2013/186462, U.S. Pat. No. 9,075,303 B2.
JP 2014-214179, U.S. Pat. No. 10,288,770 B2.
JP 2010/230944, U.S. Pat. No. 8,532,442, B2.

(Continued)

*Primary Examiner* — Megan McCulley
(74) *Attorney, Agent, or Firm* — Venable LLP

(57) ABSTRACT

A curable resin composition includes (A) a specific curable resin and (C) a curing agent, and further includes (BI) 0.1 parts by mass or more and 20 parts by mass or less of a polyhydric alcohol having 2 to 5 hydroxyl groups, based on based on 100 parts by mass of the curable resin (A); (BII) a cyclic compound having 3 to 6 reactive groups and a reactive group equivalent of 100 g/eq or more and 300 g/eq or less; or (BIII) a specific oxetane compound in a mass ratio of the curable resin (A) to the oxetane compound (BIII) being 5:5 to 9:1.

21 Claims, 2 Drawing Sheets

(56) References Cited

FOREIGN PATENT DOCUMENTS

| | | |
|---|---|---|
| JP | 2009-049396 A | 3/2009 |
| JP | 2009-091389 A | 4/2009 |
| JP | 2009-191129 A | 8/2009 |
| JP | 2010-077343 A | 4/2010 |
| JP | 2010-230944 A | 10/2010 |
| JP | 2010-265408 A | 11/2010 |
| JP | 2011-146928 A | 7/2011 |
| JP | 2013-023574 A | 2/2013 |
| JP | 2013-151703 A | 8/2013 |
| JP | 2013-186462 A | 9/2013 |
| JP | 2013-210606 A | 10/2013 |
| JP | 2013-228546 A | 11/2013 |
| JP | 2014-214179 A | 11/2014 |
| JP | 2016-196597 A | 11/2016 |
| JP | 2018-065892 A | 4/2018 |
| WO | 2007/034679 A1 | 3/2007 |
| WO | 2013/172407 A1 | 11/2013 |
| WO | 2015/141717 A1 | 9/2015 |
| WO | 2017/038620 A1 | 3/2017 |
| WO | 2017/141935 A1 | 8/2017 |

OTHER PUBLICATIONS

JP 2013-228546, U.S. Pat. No. 8,867,885, B2.
JP 2018-065892, 2020/0055979 A1.
JP 2016-196597, U.S. Pat. No. 10,662,278 B2.
JP 2013-210606, 2013/0012618 A1.
JP 2005-053936, 2007/0004816 A1.
WO 2017/038620, 2018/0273722 A1.
WO 2013/172407, U.S. Pat. No. 9,416,220 B2.
JP 2000-302964, 2002/0132872 A1 2005/0171255 A1 2007/0043138 A1.
JP 2006-33579, 2006/0017459 A1.
WO 2007/034679, 2009/0233094 A1.
WO 2015/141717, 2017/0023859 A1.

* cited by examiner

CURABLE RESIN COMPOSITION

This application is a divisional application of U.S. patent application Ser. No. 16/211,419, filed Dec. 6, 2018, which claims the benefit of Japanese Patent Application No. 2017-238733, filed Dec. 13, 2017, Japanese Patent Application No. 2017-238734, filed Dec. 13, 2017, Japanese Patent Application No. 2017-238735, filed Dec. 13, 2017, Japanese Patent Application No. 2018-223323, filed Nov. 29, 2018, and Japanese Patent Application No. 2018-223324, filed Nov. 29, 2018. All of these prior applications are hereby incorporated by reference herein in their entirety.

BACKGROUND OF THE INVENTION

Field of the Invention

The present invention relates to a curable resin composition, and a method of manufacturing a three-dimensional shaped article using the same.

Description of the Related Art

A method of optically forming a three-dimensional shaped article by curing a liquid curable resin by layer by energy-active light such as an ultraviolet ray, and laminating the layers to obtain a three-dimensional shaped article, has been intensively studied. The optical three-dimensional shaped article is developed into a prototype for confirming a shape (rapid prototyping), and also creation of a type (rapid tooling) and service parts (real products) (rapid manufacturing). Accordingly, a demand for material properties for a three-dimensional shaped article (toughness, thermal resistance, etc.) is becoming higher, and recently, physical properties equivalent to those of engineering plastics have been demanded.

The three-dimensional shaped article by a curable resin is required to have certain degrees of hardness (modulus of elasticity) and toughness, and in particular high fracture toughness. Japanese Patent Application Laid-Open No. 2000-302964 has reviewed a system of adding a polyhydric alcohol to a resin composition for improving toughness of three-dimensional shaping.

However, since the modulus of elasticity and toughness are in a reciprocal relationship, when the toughness of the composition of Japanese Patent Application Laid-Open No. 2000-302964 is increased, the modulus of elasticity thereof is lowered, and thus, the composition of Japanese Patent Application Laid-Open No. 2000-302964 is insufficient for being used in rapid prototyping or rapid manufacturing.

SUMMARY OF THE INVENTION

Based on the above circumstances, an object of the present invention is to provide a resin composition which is appropriate for rapid prototyping or rapid manufacturing and can impart a cured product having excellent toughness.

A curable resin composition according to an aspect of the present invention includes:
(A) a curable resin represented by the following General Formula (1):

General Formula (1)

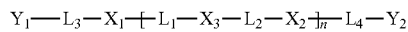

where
$X_1$ and $X_2$ are independently a divalent linking group containing an aromatic ring,
$X_3$ is an alkylene group having 4 to 18 carbon atoms, in which a carbon atom forming the alkylene group may be substituted by an oxygen atom, a sulfur atom, a nitrogen atom, or a silicon atom,
$L_1$, $L_2$, $L_3$, and $L_4$ are independently of one another a divalent linking group containing one or more bonds selected from the group consisting of —O—, —C—O—, —S—, —C—S—, an ester bond, a urethane bond, an ether bond, a thiourethane bond, and a thio-ether bond,
$Y_1$ and $Y_2$ are independently of each other an epoxy group, a cycloalkene oxide group, or an oxetanyl group, and
n is an average value of repeating structural units, and a real number of 0.1 or more and 10 or less; and
(C) a curing agent,
wherein the curable resin composition further includes:
(BI) 0.1 parts by mass or more and 20 parts by mass or less of a polyhydric alcohol having 2 to 5 hydroxyl groups, based on 100 parts by mass of the curable resin (A);
(BII) a cyclic compound having 3 to 6 reactive groups and a reactive group equivalent of 100 g/eq or more and 300 g/eq or less; or
(BIII) an oxetane compound represented by the following General Formula (2):

General Formula (2)

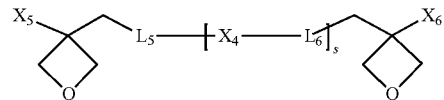

where
$X_4$ is a divalent linking group which is linked by a carbon atom forming an aromatic ring,
$X_5$ and $X_6$ are independently of each other a hydrogen atom or an alkyl group having 1 to 6 carbon atoms,
$L_5$ and $L_6$ are independently of each other a divalent linking group containing a bond selected from the group consisting of —O—, —C—O—, an ester bond, and an ether bond, and
s is an average value of repeating structural units, and a real number of 0.1 or more and 10 or less,
a mass ratio of the curable resin (A) to the oxetane compound (BIII) being 5:5 to 9:1.

According to the present invention, there is provided a curable resin composition which allows a cured product having excellent toughness to be formed, and is preferred for three-dimensional shaping.

Further features of the present invention will become apparent from the following description of exemplary embodiments with reference to the attached drawings.

DESCRIPTION OF THE EMBODIMENTS

Figure 1:
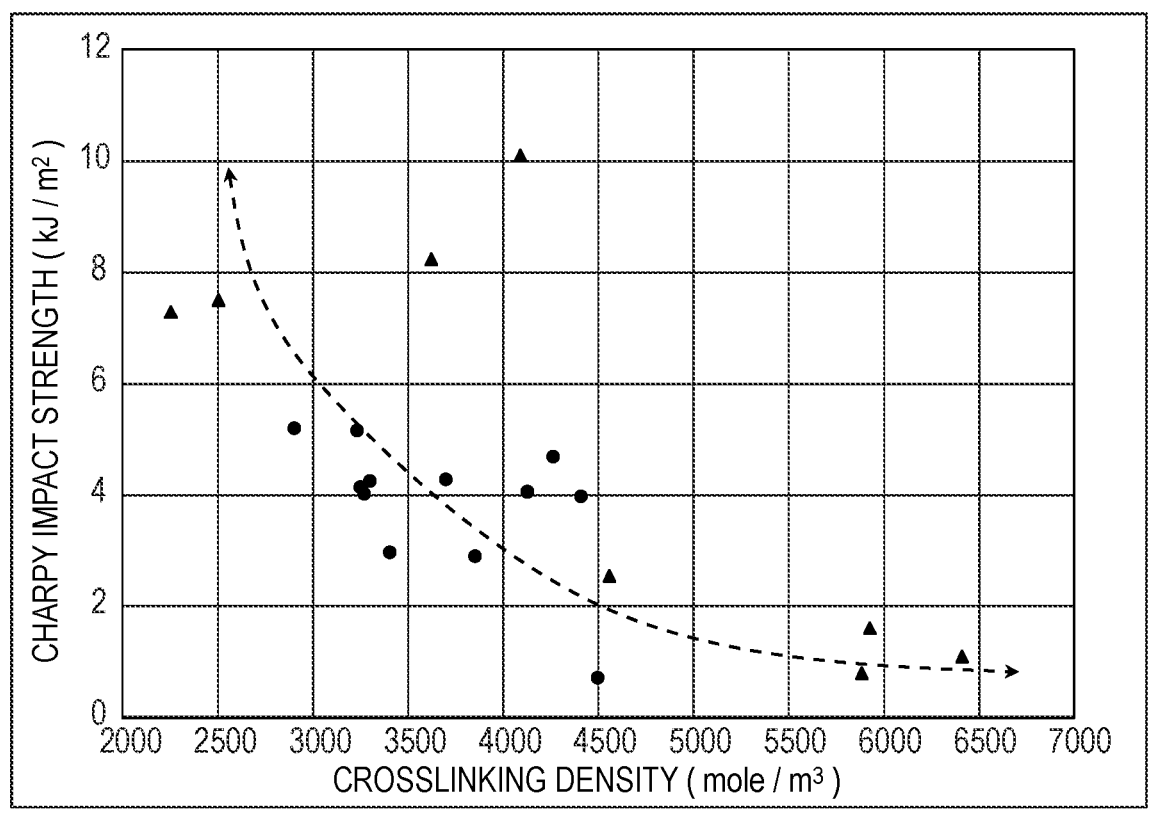
FIG. 1 is a graph representing a relationship between crosslinking density (calculated value) and Charpy impact strength.

Preferred embodiments of the present invention will now be described in detail in accordance with the accompanying drawings. An embodiment described below is merely one of the embodiments of the present invention, and the present invention is not limited thereto.

First Embodiment

A curable resin composition according to the present embodiment includes:
(A) a curable resin represented by the following General Formula (1):

General Formula (1)

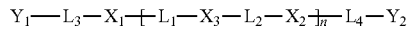

where
- $X_1$ and $X_2$ are independently of each other a divalent linking group containing an aromatic ring,
- $X_3$ is an alkylene group having 4 to 18 carbon atoms, in which a carbon atom forming the alkylene group may be substituted by an oxygen atom, a sulfur atom, a nitrogen atom, or a silicon atom,
- $L_1$, $L_2$, $L_3$, and $L_4$ are independently of one another a divalent linking group having one or more bonds selected from the group consisting of —O—, —C—O—, —S—, —C—S—, an ester bond, a urethane bond, an ether bond, a thiourethane bond, and a thioether bond,
- $Y_1$ and $Y_2$ are independently of each other an epoxy group, a cycloalkene oxide group, or an oxetanyl group, and
- n is an average value of repeating structural units, and a real number of 0.1 or more and 10 or less;

(BI) a polyhydric alcohol having 2 to 5 hydroxyl groups; and
(C) a curing agent,
wherein the polyhydric alcohol (BI) is included at 0.1 parts by mass or more and 20 parts by mass or less, based on 100 parts by mass of the curable resin (A).

<Curable Resin (A) (Component (A))>

The curable resin (A) used in the present invention is represented by the following General Formula (1):

General Formula (1)

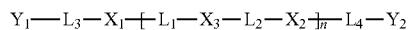

where $X_1$ and $X_2$ are independently of each other a divalent linking group containing an aromatic ring. It is preferred that $X_1$ and $X_2$ have two or less aromatic rings, from the viewpoint of ease of availability and solubility in solvents. When there are two or less aromatic rings, it is difficult for problems in a synthesis reaction such as increased crystallinity and poor solubility in solvents to occur. $X_1$ and $X_2$ may be linking groups linked to an adjacent group ($L_1$, $L_2$, $L_3$, and $L_4$) by a carbon atom forming an aromatic ring, or a linking group linked to an adjacent group by an atom other than a carbon atom forming an aromatic ring, however, it is preferred that $X_1$ and $X_2$ are a linking group linked to an adjacent group by a carbon atom forming an aromatic ring.

An example of $X_1$ and $X_2$ may include a hydrocarbon group having a structure having only one aromatic ring, a hydrocarbon group having a structure in which an aromatic ring is bonded via a single bond, a hydrocarbon group having a structure in which an aromatic ring is bonded via an aliphatic carbon atom, a hydrocarbon group having a structure in which an aromatic ring is bonded via an aliphatic cyclic hydrocarbon group, a hydrocarbon group having a structure in which a plurality of benzene rings are condensed and polycyclized, a hydrocarbon group having a structure in which an aromatic ring is bonded via an aralkyl group, a hydrocarbon group having a structure in which an aromatic ring is bonded via an oxygen atom, a sulfur atom, a nitrogen atom, or silicon atom, or the like. Specific example thereof may include a phenylene group, a biphenylene group, a naphthalenediyl group, an anthracenediyl group, a phenanthrenediyl group, a fluorenediyl group, a diphenylmethanediyl group, a diphenylethanediyl group, a diphenylpropanediyl group, a diphenyletherdiyl group, a diphenylsulfonediyl group, or the like. These groups may be unsubstituted or substituted. An example of the substituent may include a straight chain or branched chain alkyl group having 1 to 6 carbon atoms, and the like.

In particular, from the viewpoint of excellent balance of flexibility and toughness of a cured product obtained from the curable resin composition of the present invention, and light transmittance, a diphenylmethanediyl group (General Formula (1-I)), a diphenylpropanediyl group (General Formula (1-II)), a biphenylene group (General Formula (1-III)), and a diphenyletherdiyl group (General Formula (1-IV)) are preferred, and these groups may be unsubstituted or substituted. An example of the substituent may include a straight chain or branched chain alkyl group having 1 to 6 carbon atoms.

General Formula (1-I)

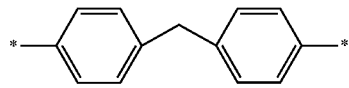

General Formula (1-II)

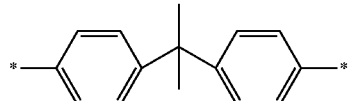

General Formula (1-III)

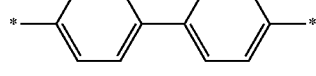

General Formula (1-IV)

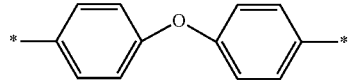

General Formula (1-V)

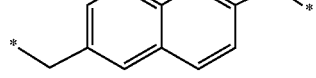

General Formula (1-VI)

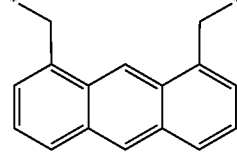

where * denotes a bond to $L_1$, $L_2$, $L_3$, or $L_4$.

$X_3$ is an alkylene group having 4 to 18 carbon atoms, preferably 4 to 12 carbon atoms, and more preferably 4 to 10 carbon atoms. When there are 3 or less carbon atoms, flexibility is damaged, so that sufficient toughness cannot be exhibited. In addition, when there are 19 or more carbon atoms, hardness of a cured product is lowered, resulting in a damaged modulus of elasticity. A specific example of $X_3$ may include an acyclic alkylene group having a straight chain or branched chain structure such as a butylene group, a pentylene group, a hexylene group, a heptylene group, an octylene group, a nonylene group, a decanylene group, a dodecanylene group, a tridecanylene group, a tetradecanylene group, a pentadecanylene group, a hexadecanylene group, a heptadecanylene group, and an octadecanylene group; or an alkylene group having a cyclic structure such as a bicyclic structure, a tricyclic structure, or a polycyclic structure, such as a cyclobutylene group, a cyclopentylene group, a cyclohexylene group, a cycloheptylene group, and a cyclooctylene group, and the like, and may be unsubstituted or substituted. An example of the substituent may include a straight chain or branched chain alkyl group having 1 to 6 carbon atoms, or the like. Among them, from the viewpoint of ease of availability, an acyclic alkylene group having 4 to 12 carbon atoms, having a straight chain or branched chain structure is preferred, and a straight chain acyclic alkylene group having 4 to 10 carbon atoms is more preferred.

In $X_3$, the carbon atom forming the alkylene group may be substituted by an oxygen atom, a sulfur atom, a nitrogen atom, or a silicon atom, or $X_3$ may have a repeating structure such as oxymethylene, oxyethylene, or oxypropylene. In this case, it is preferred that there are 4 to 10 unsubstituted carbons.

The alkylene group represented by the following General Formula (1-VII) as $X_3$ is preferred from the viewpoint of compatibility between hydrophobicity or toughness and a modulus of elasticity, and the alkylene group represented by General Formula (1-VIII) is more preferred from the viewpoint of toughness improvement.

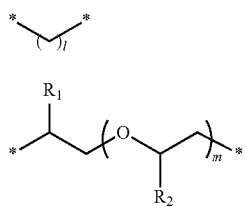

General Formula (1-VII)

General Formula (1-VIII)

where l is an integer of 4 or more and 18 or less, and preferably an integer of 4 or more and 10 or less, $R_1$ and $R_2$ are hydrogen or a methyl group, m is an integer selected so that the alkylene group has 4 to 18, preferably 4 to 10 carbon atoms. * denotes a bond to $L_1$ or $L_2$.

$L_1$, $L_2$, $L_3$, and $L_4$ are independently of one another a divalent linking group containing one or more bonds selected from the group consisting of —O—, —C—O—, —S—, —C—S—, an ester bond, a urethane bond, an ether bond, a thiourethane bond, and a thioether bond. Hereinafter, "a bond selected from the group consisting of —O—, —C—O—, —S—, —C—S—, an ester bond, a urethane bond, an ether bond, a thiourethane bond, and a thioether bond" is sometimes referred to as "a specific bond". $L_1$ to $L_4$ may be a linking group which is directly linked to an adjacent group ($Y_1$, $Y_2$, $X_1$, $X_2$, or $X_3$) by a specific bond, or a linking group which is linked by one or more carbon atoms between the specific bond and an adjacent group.

When the specific bond is one of —O—, —C—O—, —S—, and —C—S—, it is preferred that an oxygen atom or a sulfur atom of the specific bond may be bonded to a carbon atom interposed between the specific bond and the adjacent group, or a carbon atom of the adjacent group to form an ether bond or a thioether bond.

When $L_1$ to $L_4$ contains one or two bonds selected from the group consisting of —O—, —C—O—, —S—, —C—S—, an ether bond, and a thioether bond, rotational movement of a molecular chain of the curable resin (A) becomes easy, and an effect of toughness improvement becomes greater, which is thus preferred. When there are two or less bonds selected from the group consisting of —O—, —C—O—, —S—, —C—S—, an ether bond, and thioether bond, the modulus of elasticity of the cured product can be maintained, without an excessive increase of motility.

In addition, when $L_1$ to $L_4$ have a hydroxyl group, an effect of promoting a polymerization reaction of the curable resin (A) occurs, which is thus preferred. It is preferred that the number of hydroxyl groups is 6 or less in one molecule of the curable resin (A). When the number of hydroxyl groups is 6 or less in one molecule, water absorption by the curable resin composition and the cured product therefrom is not lowered, thereby having stability over time.

Specific examples of $L_1$, $L_2$, $L_3$, and $L_4$ are preferably groups represented by the following General Formulae (1-a), (1-b), (1-c), (1-d), (1-e), (1-f), and (1-g). In particular, the groups represented by General Formulae (1-a), (1-d), (1-e), (1-f), and (1-g) are more preferred from the viewpoint of availability of materials and synthesis efficiency. In addition, the groups represented by General Formula (1-d), (1-e), (1-f), and (1-g) are more preferred from the viewpoint of an effect of toughness improvement. In addition, the group represented by General Formula (1-g) is preferred from the viewpoint of promoting polymerization reaction of the curable resin (A).

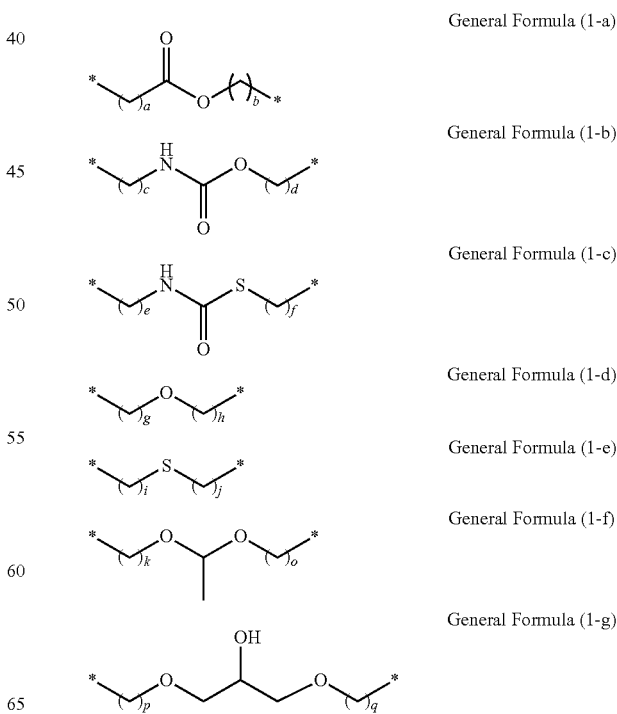

where a, b, c, d, e, f, g, h, i, j, k, o, p, and q are independently of one another an integer of 0 or more and 5 or less, and from the viewpoint of flexibility of the cured product of the composition and viscosity of the composition, preferably an integer of 0 or more and 2 or less, and from the viewpoint of further maintaining a modulus of elasticity, more preferably an integer of 0 or more and 1 or less, and * denotes a bond to $Y_1$, $Y_2$, $X_1$, $X_2$, or $X_3$.

$Y_1$ and $Y_2$ are polymerizable groups, and independently of each other an epoxy group, a cycloalkene oxide group, or an oxetanyl group. The cycloalkene oxide group may be a cyclopropeneoxide group, a cyclobuteneoxide group, a cyclopenteneoxide group, a cyclohexeneoxide group, a cyclohepteneoxide group, or the like. It is preferred that $Y_1$ and $Y_2$ are specifically represented by the following General Formula (1-h), (1-i), or (1-j), in terms of synthesis or ease of availability:

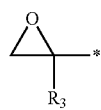

General Formula (1-h)

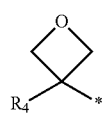

General Formula (1-i)

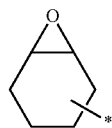

General Formula (1-j)

where $R_3$ and $R_4$ are independently of each other hydrogen or an alkyl group having 1 to 4 carbon atoms, and from the viewpoint of polymerizability and ease of availability, preferably hydrogen or an alkyl group having 1 to 2 carbon atoms, and more preferably hydrogen, and * denotes a bond to $L_3$ or $L_4$.

n denotes an average value of repeating structural units, and a real number of 0.1 or more and 10 or less. For suppressing a viscosity increase of the composition, n is preferably in a range of 0.2 or more and 5 or less, and from the viewpoint of balance of the toughness and the modulus of elasticity of the cured product, more preferably in a range of 0.5 or more and 3 or less.

As the curable resin (A), commercially available products such as for example, EPICLON EXA-4816 (manufactured by DIC Corporation), EPICLON EXA-4850-150 (manufactured by DIC Corporation), and EPICLON EXA-4850-1000 (manufactured by DIC Corporation) may be preferably used.

A specific example of the curable resin (A) is preferably the curable resin represented by the following structures, from the viewpoint of compatibility between toughness and a modulus of elasticity, and more preferably, n is 1. In addition, when there is a hydroxyl group, an effect of promoting curing of the curable resin (A) occurs, which is thus more preferred.

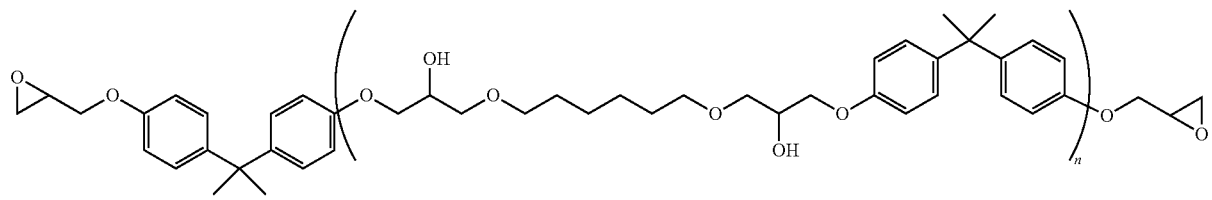

(A-i)

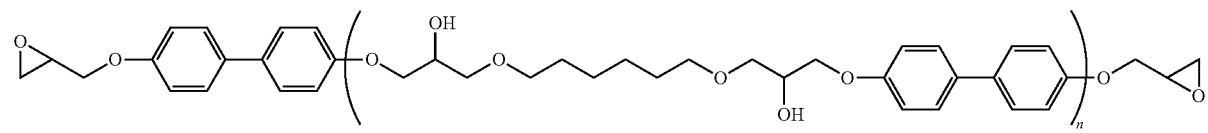

(A-ii)

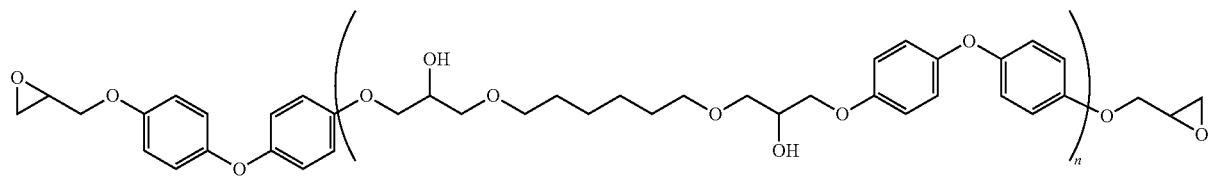

(A-iii)

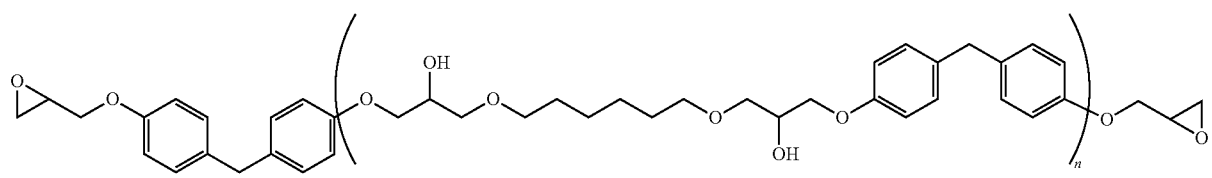

(A-iv)

-continued

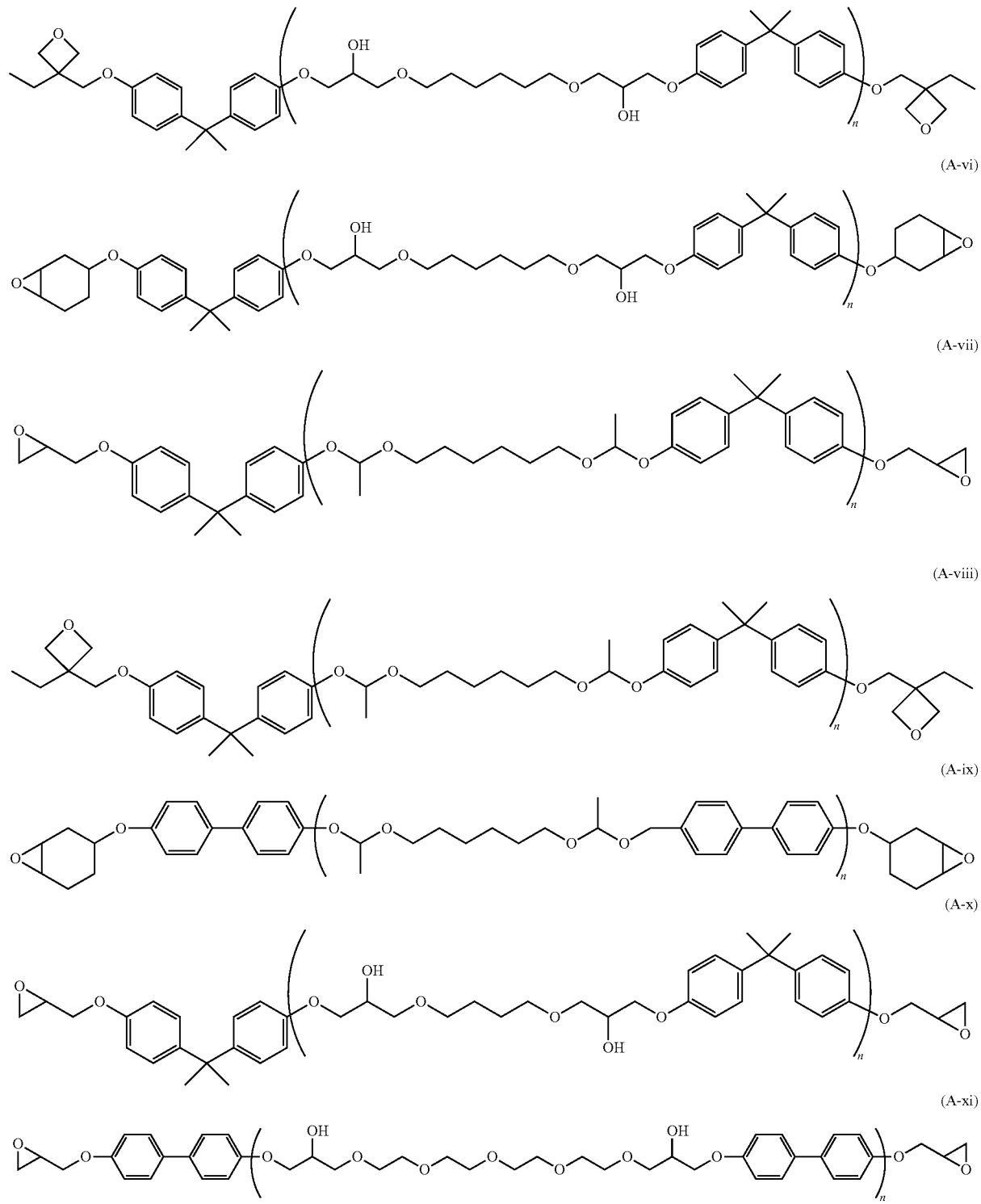

(Preparation Method of Curable Resin (A))

A preparation method of the curable resin (A) is not particularly limited, however, for example, a diglycidyl ether compound (A-1) and an aromatic dihydroxy compound (A-2) are reacted to obtain a dihydroxy compound (A-3). Then, a halogen group of a cation-polymerizable compound having a halogen group is reacted with a hydroxyl group of the dihydroxy compound (A-3) to obtain the curable resin (A).

An example of the diglycidyl ether compound (A-1) may include a compound represented by the following General Formula (3). $X_3$ corresponds to $X_3$ of General Formula (1), and the details are as defined for General Formula (1). The diglycidyl ether compound (A-1) may be used alone or in combination of two or more.

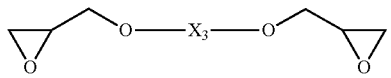

General Formula (3)

An example of the compound represented by General Formula (3) may include 1,4-butanediol diglycidyl ether, diethyleneglycol diglycidyl ether, neopentyl glycol diglycidyl ether, 1,6-hexanediol diglycidyl ether, 1,7-heptanediol diglycidyl ether, 1,8-octanediol diglycidyl ether, 1,4-cyclohexanedimethanol diglycidyl ether, tripropylene glycol diglycidyl ether, 1,9-nonaediol diglycidyl ether, 1,10-decanedioil diglycidyl ether, 1,11-undecanediol diglycidyl ether, 1,12-dodecanediol diglycidyl ether, 1,18-stearyldiol diglycidyl ether, or the like.

An example of the aromatic dihydroxy compound (A-2) may include a compound represented by the following General Formula (5). $X_7$ corresponds to $X_1$ and $X_2$ of General Formula (1), and the details are as defined for General Formula (1).

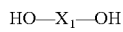 General Formula (5)

An example of the compound represented by General Formula (5) may include 1,4-dihydroxybenzene, catechol, 4,4'-dihydroxydiphenylmethane, 4,4'-methylenebis(2,6-dimethylphenol), 2,2-bis(4-hydroxyphenyl)propane, 2,2'-methylenebis(4-methylphenol), 4,4'-ethylidenebisphenol, 4,4'-dihydroxybenzophenone, 4,4'-(1,3-dimethylbutylidene)diphenol, 4,4'-(α-methylbenzylidene)bisphenol, 4,4'-(α-methylbenzylidene)bisphenol, 4,4'-dihydroxytetraphenylmethane, 2,7-naphthalenediol, 2,3-naphthalenediol, 2,6-anthracenediol, or the like.

The cation-polymerizable compound having a halogen group refers to a compound having an epoxy group, a cycloalkene oxide group, or an oxetanyl group, simultaneously with having a halogen group such as —I, —Br, and —Cl. A specific example thereof may include 2-(chloromethyl)-1,2-epoxypropane, 2-(chloromethyl)-1,2-epoxybutane, or the like.

In addition, as other preparation methods, a difunctional phenol compound as an aromatic dihydroxy compound and divinyl ether are reacted. Then, the obtained difunctional phenol resin is reacted with the cation-polymerizable compound having a halogen group to obtain the curable resin (A).

<Polyhydric Alcohol (BI) (Component (BI))>

The polyhydric alcohol (BI) is useful for expressing toughness improvement of a cured product. The polyhydric alcohol used as the component (BI) has, in one molecule, 2 to 5 hydroxyl groups, preferably 2 to 4 hydroxyl groups, and more preferably 2 hydroxyl groups. When an alcohol having one hydroxyl group in one molecule is used, poor curing occurs. Meanwhile, when a polyhydric alcohol having 6 or more hydroxyl groups in one molecule is included, the toughness of the obtained cured product tends to be lowered.

As a dihydric alcohol, for example, salicyl alcohol, catechol, resorcinol, hydroquinone, 1,4-benzenedimethanol, bisphenol A, bisphenol F, neopentyl glycol ethylene glycol, propanediol, butanediol, pentanediol, hexanediol, or the like may be used. As a trihydric alcohol, for example, glycerin, phloroglucinol, trimethylolpropane, or the like may be used. As a tetrahydric alcohol, for example, erythritol, threitol, pentaerythritol, or the like may be used. As a pentahydric alcohol, for example, xylitol, arabitol, fucitol, glycose, galactose, fructose, or the like may be used. The polyhydric alcohol (BI) is not limited thereto. In addition, the polyhydric alcohol (BI) may be used alone or in combination or two or more.

The polyhydric alcohol (BI) has a molecular weight of preferably 1,000 or less, and more preferably 800 or less. When the molecular weight is more than 1,000, there is a possibility to locally lower crosslinking density to reduce a modulus of elasticity.

The content of the polyhydric alcohol (BI) is 0.1 parts by mass or more and 20 parts by mass or less, preferably 0.2 parts by mass or more and 15 parts by mass or less, and more preferably 0.5 parts by mass or more and 10 parts by mass or less, based on 100 parts by mass of the component (A) (when the component (D) is included, based on total 100 parts by mass of component (A) and component (D)). When the content of the polyhydric alcohol (BI) is less than 0.1 parts by mass, the effect of the polyhydric alcohol (BI) does not occur, so that a cured product having a sufficient modulus of elasticity is not obtained. When the content of the polyhydric alcohol (BI) is more than 20 parts by mass, the polyhydric alcohol (BI) interferes with polymerization of the component (A), and when the component (D) is included, the polyhydric alcohol (BI) interferes with polymerization of the component (A) and the component (D), whereby sufficient toughness is not obtained.

(Function of Polyhydric Alcohol (BI))

A mechanism representing toughness improvement of the curable composition of the present embodiment will be described using a case including an epoxy resin as the component (A), a cationic polymerization initiator as the component (C), and the component (D) as an example. When the cationic polymerization initiator absorbs an active energy ray or thermal energy, cations occur, and these cations initiate cationic polymerization of an epoxy group of the component (A) or an oxetanyl group of the component (D). The epoxy group and the oxetanyl group are cationically polymerized with each other or respectively to increase the molecular weight, and since the activated epoxy group and oxetanyl group are labile, polymerization is easily stopped. Thus, a low-molecular weight polymer chain having an unreacted epoxy group or oxetanyl group at the end of the polymer is produced. The component (BI) of the present embodiment has a higher molecular weight by reacting these low molecular weight polymer chains with a hydroxyl group, thereby improving toughness, for example, as represented in the following formula. In addition, it is considered that a polyhydric alcohol incorporated to the polymer chain forms a hydrogen bond, thereby more efficiently improving toughness.

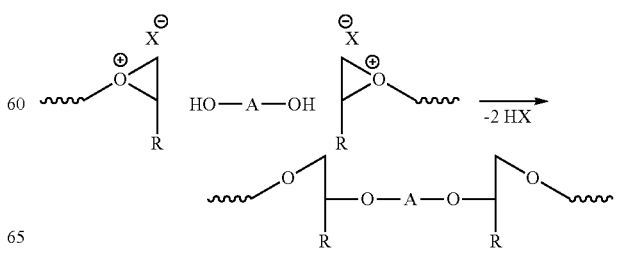

<Curing Agent (C) (Component (C))>

As the curing agent (C), a cation-polymerizable initiator such as a photoacid generator, a photobase generator, and a thermal acid generator can be used. To the extent that the effect of the present invention is not impaired, the curing agent may be used alone or in combination of two or more. When a three-dimensional shaped article is formed by photocuring, it is preferred to use the photoacid generator or the photobase generator, and it is particularly preferred to use the photoacid generator, due to the stability over time of the curable resin composition of the present invention or the restriction of the three-dimensional shaping method. In addition, as the curing agent (C), a radical polymerization initiator, for example, other curing agents such as a thermal latent curing agent may be included.

[Cationic Polymerization Initiator]

(Photoacid Generator)

An example of a photoacid generator is a photocation-polymerizable initiator which generates an acid capable of initiating cationic polymerization by irradiation of an energy ray such as an ultraviolet ray. When the photoacid generator is used as a curable resin for three-dimensional shaping, it is preferred to use the photocation-polymerizable initiator.

As the photocation-polymerizable initiator, for example, an onium salt having a cation portion which is an aromatic sulfonium, an aromatic iodonium, an aromatic diazonium, an aromatic ammonium, a thianthrenium, a thioxanthonium, or a (2,4-cyclopentadien-1-yl)[(1-methylethylbenzene]-Fe cation, and an anion portion which contains $BF_4^-$, $PF_6^-$, $SbF_6^-$, or $[BX_4]^-$ (with a proviso that X is a phenyl group substituted by two or more fluorine or trifluoromethyl groups) may be used alone or in combination of two or more.

As the aromatic sulfonium salt, for example, bis[4-(diphenylsulfonio)phenyl]sulfidebishexafluorophosphate, bis[4-(diphenylsulfonio)phenyl]sulfidebishexafluoroantimonate, bis[4-(diphenylsulfonio)phenyl]sulfidebistetrafluoroborate, bis[4-(diphenylsulfonio)phenyl]sulfidetetrakis(pentafluorophenyl)borate, diphenyl-4-(phenylthio)phenylsulfoniumhexafluorophosphate, diphenyl-4-(phenylthio)phenylsulfoniumhexafluoroantimonate, diphenyl-4-(phenylthio)phenyl sulfoniumtetrafluoroborate, diphenyl-4-(phenylthio)phenylsulfoniumtetrakis(pentafluorophenyl)borate, triphenylsulfoniumhexafluorophosphate, triphenylsulfoniumhexafluoroantimonate, triphenylsulfoniumtetrafluoroborate, triphenylsulfoniumtetrakis(pentafluorophenyl)borate, bis[4-(di(4-(2-hydroxyethoxy))phenylsulfonio)phenyl]sulfidebishexafluorophosphate, bis[4-(di(4-(2-hydroxyethoxy))phenylsulfonio)phenyl]sulfidebishexafluoroantimonate, bis[4-(di(4-(2-hydroxyethoxy))phenylsulfonio)phenyl]sulfidebistetrafluoroborate, bis[4-(di(4-(2-hydroxyethoxy))phenylsulfonio)phenyl]sulfidetetrakis(pentafluorophenyl)borate, or the like may be used.

In addition, as the aromatic iodonium salt, for example, diphenyliodoniumhexafluorophosphate, diphenyliodoniumhexafluoroantimonate, diphenyliodoniumtetrafluoroborate, diphenyliodoniumtetrakis(pentafluorophenyl)borate, bis(dodecylphenyl)iodoniumhexafluorophosphate, bis(dodecylphenyl)iodoniumhexafluoroantimonate, bis(dodecylphenyl)iodoniumtetrafluoroborate, bis(dodecylphenyl)iodoniumtetrakis(pentafluorophenyl)borate, 4-methylphenyl-4-(1-methylethyl)phenyliodoniumhexafluorophosphate, 4-methylphenyl-4-(1-methylethyl)phenyliodoniumhexafluoroantimonate, 4-methylphenyl-4-(1-methylethyl)phenyliodoniumtetrafluoroborate, 4-methylphenyl-4-(1-methylethyl)phenyliodoniumtetrakis(pentafluorophenyl)borate, or the like may be used.

In addition, as the aromatic diazonium salt, for example, phenyldiazoniumhexafluorophosphate, phenyldiazoniumhexafluoroantimonate, phenyldiazoniumtetrafluoroborate, phenyldiazoniumtetrakis(pentafluorophenyl)borate, or the like may be used.

In addition, as the aromatic ammonium salt, 1-benzyl-2-cyanopyridiniumhexafluorophosphate, 1-benzyl-2-cyanopyridiniumhexafluoroantimonate, 1-benzyl-2-cyanopyridiniumtetrafluoroborate, 1-benzyl-2-cyanopyridiniumtetrakis(pentafluorophenyl)borate, 1-(naphthylmethyl)-2-cyanopyridiniumhexafluorophosphate, 1-(naphthylmethyl)-2-cyanopyridiniumhexafluoroantimonate, 1-(naphthylmethyl)-2-cyanopyridiniumtetrafluoroborate, 1-(naphthylmethyl)-2-cyanopyridiniumtetrakis(pentafluorophenyl)borate, or the like may be used.

In addition, as the thianthrenium salt, 5-methylthianthreniumhexafluorophosphate, 5-methyl-10-oxothianthreniumtetrafluoroborate, 5-methyl-10,10-dioxothianthreniumhexafluorophosphate, or the like may be used.

In addition, as the thioxanthonium salt, S-biphenyl 2-isopropylthioxanthoniumhexafluorophosphate, or the like may be used.

In addition, as the (2,4-cyclopentadien-1-yl)[(1-methylethyl)benzene]-Fe salt, (2,4-cyclopentadien-1-yl)[(1-methylethylbenzene]-Fe(II)hexafluorophosphate, (2,4-cyclopentadien-1-yl)[(1-methylethylbenzene]-Fe(II)hexafluoroantimonate, (2,4-cyclopentadien-1-yl)[(1-methylethylbenzene]-Fe(II)tetrafluoroborate, (2,4-cyclopentadien-1-yl)[(1-methylethylbenzene]-Fe(II)tetrakis(pentafluorophenyl)borate, or the like may be used.

As the photocation-polymerizable initiator, for example, CPI®-100P, CPI®-110P, CPI®-101A, CPI®-200K, and CPI®-210S (all manufactured by San-Apro Ltd.), CYRACURE® photocuring initiator UVI-6990, CYRACURE® photocuring initiator UVI-6992, and CYRACURE® photocuring initiator UVI-6976 (all manufactured by Dow Chemical Japan Limited), ADEKA OPTOMER SP-150, ADEKA OPTOMER SP-152, ADEKA OPTOMER SP-170, ADEKA OPTOMER SP-172, and ADEKA OPTOMER SP-300 (all manufactured by ADEKA Corporation), CI-5102 and CI-2855 (both manufactured by Nippon Soda Co., Ltd.), SAN-AID® SI-60L, SAN-AID® SI-80L, SAN-AID® SI-100L, SAN-AID® SI-110L, SAN-AID® SI-180L, SAN-AID® SI-110, and SAN-AID® SI-180 (all manufactured by SANSHIN CHEMICAL INDUSTRY CO., LTD.), ESACURE® 1064 and ESACURE® 1187 (both manufactured by Lamberti Group), Omnicat 550 (manufactured by IGM Resins, Co., Ltd.), Irgacure® 250 (manufactured by BASF Corporation), RHODORSILPHOTOINITIATOR 2074 (manufactured by Rhodia Japan, Ltd.), or the like is commercially available.

In the present invention, two or more photocationic polymerization initiators may be used in combination; however, the photocationic polymerization initiator may be used alone. In addition, in order to proceed with a polymerization reaction in heat treatment after shaping, other curing agents such as a thermal cationic polymerization initiator may be included at the same time.

(Photobase Generator)

A photobase generator refers to a compound which generates a base by irradiation of an energy ray such as an ultraviolet ray or visible ray. In particular, since the photobase generator has good sensitivity to light, a salt containing a borate anion is preferred. A specific product thereof may include U-CAT® 5002 or the like manufactured by San- Apro Ltd., or P3B, BP3B, N3B, MN3B, or the like manufactured by Showa Denko K.K., but is not limited thereto.
(Thermal Acid Generator)

A thermal acid generator is also called a thermal cationic polymerization initiator. The thermal acid generator exerts a substantial function as a curing agent, whereby a compound containing a cationic species is excited by heating, and undergoes a thermal decomposition reaction to proceed with thermosetting. Unlike acid anhydrides, amines, phenol resins, or the like which are commonly used as a curing agent, the thermal cationic polymerization initiator does not cause a viscosity increase over time or gelation of a resin composition at room temperature, even in the case that it is included in the resin composition. Thus, it is possible to provide a one-part resin composition having an excellent handling property.

An example of the thermal cationic polymerization initiator may include diphenyliodoniumhexafluoroarsenate, diphenyliodoniumhexafluorophosphate, diphenyliodoniumtrifluoromethanesulfonate, triphenylsulfoniumtetrafluoroborate, tri-p-tolylsulfoniumhexafluorophosphate, tri-p-tolylsulfoniumtrifluoromethanesulfonate, bis(cyclohexylsulfonyl)diazomethane, bis(tert-butylsulfonyl)diazomethane, bis(p-toluenesulfonyl)diazomethane, triphenylsulfoniumtrifluoromethanesulfonate, diphenyl-4-methylphenylsulfoniumtrifluoromethanesulfonate, diphenyl-2,4,6-trimethylphenylsulfonium-p-toluenesulfonate, diphenyl-p-phenylthiophenylsulfoniumhexafluorophosphate, or the like.

In the present invention, as the thermal cationic polymerization initiator, for example, commercial products such as AMERICURE series (manufactured by American Can Co. which is a diazonium salt-based compound, ULTRASET series (manufactured by ADEKA Corporation), WPAG series (manufactured by Wako Pure Chemical Corporation), UVE series (manufactured by General Electric Company) which is an iodonium salt-based compound, FC series (manufactured by 3M Company), UV9310C (manufactured by Ge Toshiba Silicones Co., Ltd.), WPI series (manufactured by Wako Pure Chemical Corporation), CYRACURE series which is a sulfonium salt-based compound (manufactured by Union Carbide Corporation), UVI series (manufactured by General Electric Company), FC series (manufactured by 3M Company), CD series (manufactured by Sartomer Company), Optomer SP series and Optomer CP series (manufactured by ADEKA Corporation), SAN-AID SI series (manufactured by SANSHIN CHEMICAL INDUSTRY CO., LTD.), CI series (manufactured by Nippon Soda Co., Ltd.), WPAG series (manufactured by Wako Pure Chemical Corporation), CPI series (manufactured by San-Apro Ltd.), or the like may be used.

In the present invention, the thermal cationic polymerization initiator may be used in combination of two or more, or may be used alone. In addition, in order to proceed with a polymerization reaction by heat treatment after shaping, the thermal cationic polymerization initiator which performs decomposition at high temperature may be used.
(Added Amount of Cationic Polymerization Initiator)

The added amount of a cationic polymerization initiator is preferably 0.05 parts by mass or more and 20 parts by mass or less, and more preferably 0.1 parts by mass or more and 5 parts by mass or less, based on 100 parts by mass of the component (A) (when the component (D) is included, based on total 100 parts by mass of the component (A) and the component (D)). When the added amount of the cationic polymerization initiator is less than 0.05 parts by mass, a polymerization activation species to be produced is insufficient, a polymerization conversion rate of the resin composition is lowered, and as a result, there is a possibility that strength of the cured product is insufficient. When the added amount of the cationic polymerization initiator is more than 20 parts by mass, the starting point of polymerization is increased, whereby polymerization is not sufficiently repeated, and thus, there is a possibility that the cured product has insufficient strength.
[Radical Polymerization Initiator]

When the resin composition according to the present embodiment includes in particular a radical polymerizable compound (F), a radical polymerization initiator may be included.

The radical polymerization initiator is mainly classified into an intramolecular cleavage type and a hydrogen drawing type. In the intramolecular cleavage type radical polymerization initiator, a bond at a specific site is broken by absorbing light at a specific wavelength, a radical occurs at the broken site, and the radical becomes a polymerization initiator, whereby polymerization of the radical polymerizable compound (F) begins. Meanwhile, in the case of the hydrogen drawing type, light at a specific wavelength is absorbed to reach an excitation state, and the excited species causes a hydrogen abstraction reaction from a hydrogen donor to generate a radical, which becomes a polymerization initiator, thereby initiating polymerization of the radical polymerizable compound (F).

As the intramolecular cleavage type photoradical polymerization initiator, an alkylphenone-based photoradical polymerization initiator, an acylphosphineoxide-based photoradical polymerization initiator, and an oxime ester-based photoradical polymerization initiator are known in the art. These photoradical polymerization initiators are the types in which a bond adjacent to a carbonyl group is α-cleaved to produce a radical species. The alkylphenone-based photoradical polymerization initiator may include a benzylmethylketal-based photoradical polymerization initiator, an α-hydroxyalkylphenone-based photoradical polymerization initiator, an aminoalkylphenone-based photoradical polymerization initiator, or the like. As a specific compound, for example, 2,2'-dimethoxy-1,2-diphenylethane-1-one (Irgacure® 651, manufactured by BASF Corporation) or the like as the benzylmethylketal-based photoradical polymerization initiator; 2-hydroxy-2-methyl-1-phenylpropane-1-one (Darocur® 1173, manufactured by BASF Corporation), 1-hydroxycyclohexylphenylketone (Irgacure® 184, manufactured by BASF Corporation), 1-[4-(2-hydroxyethoxy)phenyl]-2-hydroxy-2-methyl-1-propane-1-one (Irgacure® 2959, manufactured by BASF Corporation), 2-hydroxy-1-{4-[4-(2-hydroxy-2-methylpropionyl)benzyl]phenyl}-2-methylpropane-1-one (Irgacure® 127, manufactured by BASF Corporation), or the like as the α-hydroxyalkylphenone-based photoradical polymerization initiator; 2-methyl-1-(4-methylthiophenyl)-2-morpholinopropane-1-one (Irgacure® 907, manufactured by BASF Corporation), 2-benzylmethyl-2-dimethylamino-1-(4-morpholinophenyl)-1-butanone (Irgacure® 369, manufactured by BASF Corporation), or the like as the aminoalkylphenon-based photoradical polymerization initiator may be included, but is not limited thereto. The acylphosphineoxide-based photoradical polymerization initiator may include 2,4,6-trimethylbenzoyldiphenylphosphine oxide (Lucirin® TPO, manufactured by BASF Corporation), bis(2,4,6-trimethylbenzoyl)-phenylphosphine oxide (Irgacure® 819, manufactured by BASF Corporation), or the like, but is not limited thereto. The oxime ester-based photoradical polymerization initiator may include (2E)-2-(benzoyloxyimino)-1-[4-(phenylthio)phenyl]octane-1-one (Irgacure® OXE-01, manufactured by BASF Corporation) or the like, but is not limited thereto.

The hydrogen drawing type radical polymerization initiator may include anthraquinone derivatives such as 2-ethyl-9,10-anthraquinone and 2-t-butyl-9,10-anthraquinone, and thioxantone derivatives such as isopropyl thioxantone and 2,4-diethyl thioxantone, but is not limited thereto.

In the present invention, the photoradical polymerization initiator may be used in combination of two or more, but also used alone. In addition, in order to proceed with a polymerization reaction in the heat treatment after shaping, a thermal radical polymerization initiator may be included.

The added amount of the photoradical polymerization initiator is preferably 0.1 parts by mass or more and 15 parts by mass or less, and more preferably 0.1 parts by mass or more and 10 parts by mass or less, based on 100 parts by mass of the radical polymerizable compound (F). When the amount of the photoradical polymerization initiator is small, polymerization tends to be insufficient. When the amount of the initiator is large, a light transmittance is lowered, and polymerization may become heterogeneous.

In addition, the thermal radical polymerization initiator is not particularly limited, as long as it generates a radical by heating, and conventional existing compounds may be used, and an azo-based compound, peroxides and persulfates may be illustrated as a preferred example. The azo-based compound may include 2,2'-azobisisobutyronitrile, 2,2'-azobis (methylisobutylate), 2,2'-azobis-2,4-dimethylvaleronitrile, 1,1'-azobis(1-acetoxy-1-phenylethane), or the like. The peroxides may include benzoyl peroxide, di-t-butylbenzoyl peroxide, t-butylperoxy pivalate, di(4-t-butylcyclohexyl) peroxy decarbonate, or the like. The persulfates may include persulfate salts such as ammonium persulfate, sodium persulfate and potassium persulfate, or the like.

The added amount of the thermal radical polymerization initiator is preferably 0.1 parts by mass or more and 15 parts by mass or less, and more preferably 0.1 parts by mass or more and 10 parts by mass or less, based on 100 parts by mass of the radical polymerizable compound (F). When the polymerization initiator is added in excess, the molecular weight is not increased, and physical properties may be lowered.

[Other Curing Agents]

As the curing agent (C), the following thermal latent curing agent may be used. The thermal latent curing agent refers to a curing agent which proceeds with thermal curing by overheating.

As an acid anhydride (an acid anhydride-based curing agent), a known or commonly used acid anhydride-based curing agent may be used, and though not particularly limited thereto, for example, methyltetrahydrophthalic anhydride (4-methyltetrahydrophthalic anhydride, 3-methyltetrahydrophthalic anhydride, or the like), methylhexahydrophthalic anhydride (4-methylhexahydrophthalic anhydride, 3-methylhexahydrophthalic anhydride, or the like), dodecenyl succinic anhydride, methylendomethylene tetrahydrophthalic anhydride, phthalic anhydride, maleic anhydride, tetrahydrophthalic anhydride, hexahydrophthalic anhydride, methylcyclohexenedicarboxylic anhydride, pyromellitic anhydride, trimellitic anhydride, benzophenone tetracarboxylic anhydride, nadic anhydride, methyl nadic anhydride, hydrogenated methyl nadic anhydride, 4-(4-methyl-3-pentenyl)tetrahydrophthalic anhydride, succinic anhydride, adipic anhydride, sebacic anhydride, dodecandiacid anhydride, methylcyclohexene tetracarboxylic anhydride, vinylether-maleic anhydride copolymer, alkylstyrene-maleic anhydride copolymer, or the like may be used. Among them, from the viewpoint of a handling property, an acid anhydride which is liquid at 25° C. [e.g., methyltetrahydrophthalic anhydride, methylhexahydrophthalic anhydride, dodecenyl succinic anhydride, methylendomethylenetetrahydrophthalic anhydride, or the like] is preferred. Meanwhile, an acid anhydride which is solid at 25° C. is dissolved in for example, an acid anhydride which is liquid at 25° C. to produce a liquid mixture, thereby improving the handling property as the curing agent (C) in the curable epoxy resin composition of the present invention. As the acid anhydride-based curing agent, an anhydride of saturated monocyclic hydrocarbon dicarboxylic acid (including those having a substituent such as an alkyl group bonded to a ring) is preferred, from the viewpoint of thermal resistance and transparency of the cured product.

As the amines (an amine-based curing agent), a known or commonly used amine-based curing agent may be used, and though not particularly limited thereto, an example thereof may include an aliphatic polyamine such as ethylenediamine, diethylenetriamine, triethylenetetramine, tetraethylenepentamine, dipropylenediamine, diethylaminopropylamine, and polypropylenetriamine; a cycloaliphatic polyamine such as menthendiamine, isophoronediamine, bis(4-amino-3-methyldicyclohexyl)methane, diaminodicyclohexylmethane, bis(aminomethyl)cyclohexane, N-aminoethylpiperazine, and 3,9-bis(3-aminopropyl)-3,4,8,10-tetraoxaspiro[5,5]undecane; a mononuclear polyamine such as m-phenylenediamine, p-phenylenediamine, tolylene-2,4-diamine, tolylene-2,6-diamine, mesitylene-2,4-diamine, 3,5-diethyltolylene-2,4-diamine, and 3,5-diethyltolylene-2,6-diamine; an aromatic polyamine such as biphenylenediamine, 4,4-diaminodiphenylmethane, 2,5-naphthylenediamine, and 2,6-naphthylenediamine, or the like.

As the phenols (a phenol-based curing agent), a known or commonly used phenol-based curing agent may be used, and though not particularly limited thereto, an example thereof may include an aralkyl resin such as a novolac type phenol resin, a novolac type cresol resin, a paraxylylene modified phenol resin, and a paraxylylenemetaxylylene modified phenol resin, a terpene modified phenol resin, a dicyclopentadiene modified phenol resin, triphenolpropane, or the like.

An example of the polyamide resin may include a polyamide resin having any one or both of a primary amino group and secondary amino group in the molecule.

As the imidazoles (an imidazole-based curing agent), a known or commonly used imidazole-based curing agent may be used, and though not particularly limited thereto, an example thereof may include 2-methylimidazole, 2-ethyl-4-methylimidazole, 2-undecylimidazole, 2-heptadecylimidazole, 2-phenylimidazole, 1-benzyl-2-methylimidazole, 1-cyanoethyl-2-methylimidazole, 1-cyanoethyl-2-ethyl-4-methylimidazole, 1-cyanoethyl-2-undecylimidazole, 1-cyanoethyl-2-undecylimidazoliumtrimellitate, 1-cyanoethyl-2-phenylimidazoliumtrimellitate, 2-methylimidazoliumisocyanurate, 2-phenylimidazoliumisocyanurate, 2,4-diamino-6-[2-methylimidazolyl-(1)]-ethyl-s-triazine, 2,4-diamino-6-[2-ethyl-4-methylimidazolyl-(1)]-ethyl-s-triazine, or the like.

An example of the polymercaptans (a polymercaptan-based curing agent) may include liquid polymercaptan, a polysulfide resin, or the like.

An example of the polycarboxylic acids may include adipic acid, sebacic acid, terephthalic acid, trimellitic acid, carboxyl group-containing polyester, or the like.

The added amount of other curing agents is preferably 0.1 parts by mass or more and 75 parts by mass or less, and more preferably 5 parts by mass or more and 30 parts by mass or less, based on 100 parts by mass of the component (A) (when the component (D) is included, based on total 100 parts by mass of the component (A) and the component (D)). When the amount of the thermal latent polymerization initiator is small, polymerization tends to be insufficient, and when the amount is too large, a crosslinking reaction tends to proceed, causing deterioration of toughness.

<Oxetane Compound (D) (Component (D))>

The curable resin composition of the present invention can include an oxetane compound (D) other than the component (A).

The oxetane compound (D) may be composed only one kind of oxetane compound, or plural kinds of oxetane compounds. The oxetane compound is not particularly limited, as long as it is a compound having an oxetanyl group. The number of the oxetanyl group of the oxetane compound (D) is not particularly limited. For example, a monofunctional oxetane compound having one oxetanyl group in the molecule, a difunctional oxetane compound having two oxetanyl groups in the molecule, a trifunctional oxetane compound having three oxetanyl groups in the molecule, a tetra- or higher functional oxetane compound having four or more oxetanyl groups in the molecule, or the like may be listed, but is not limited thereto. In addition, as the oxetane compound (D), an oxetane compound having an aromatic ring or an ether bond in the molecule may be used.

A specific example of the oxetane compound (D) may include a monooxetane compound such as 3-ethyl-3-[(2-ethylhexyloxy)methyl]oxetane, 3-ethyl-3-hydroxymethyloxetane, 3-ethyl-3-(4-hydroxybutyl)oxymethyloxetane, 3-ethyl-3-hexyloxymethyloxetane, 3-ethyl-3-allyloxymethyloxetane, 3-ethyl-3-benzyloxymethyloxetane, 3-ethyl-3-methacryloxymethyloxetane, 3-ethyl-3-carboxyoxetane, and 3-ethyl-3-phenoxymethyloxetane; a dioxetane compound such as bis[1-ethyl(3-oxetanyl)]methylether, 4,4'-bis[3-ethyl-(3-oxetanyl)methoxymethyl]biphenyl, 1,4-bis(3-ethyl-3-oxetanylmethoxy)methylbenzene, xylylenebisoxetane, bis[(ethyl(3-oxetanyl)]methyl carbonate, bis[ethyl(3-oxetany)]ethyl adipate, bis[ethyl(3-oxetanyl)]methyl terephthalate, bis[ethyl(3-oxetanyl)]methyl 1,4-cyclohexanecarboxylate, bis{4-[ethyl(3-oxetanyl) methoxycarbonylamino]phenyl}methane, and α,ω-bis-{3-[1-ethyl(3-oxetanyl)methoxy]propyl (polydimethylsiloxane); and a polyoxetane compound such as oligo(glycidyloxetane-co-phenylglycidylether), or the like, but is not limited thereto.

Among them, 3-ethyl-3-[(2-ethylhexyloxy)methyl]oxetane, 3-ethyl-3-hydroxymethyloxetane, 3-ethyl-3-(4-hydroxybutyl)oxymethyloxetane, bis[1-ethyl(3-oxetanyl)]methylether, 4,4'-bis[3-ethyl-(3-oxetanyl)methoxymethyl]biphenyl, 1,4-bis(3-ethyl-3-oxetanylmethoxy)methylbenzene, and xylylenebisoxetane are preferred, and 3-ethyl-3-[(2-ethylhexyloxy)methyl]oxetane, 3-ethyl-3-hydroxymethyloxetane, 3-ethyl-3-(4-hydroxybutyl)oxymethyloxetane, bis[1-ethyl(3-oxetanyl)]methylether, and 4,4'-bis[3-ethyl-(3-oxetanyl)methoxymethyl]biphenyl are more preferred, since they have low viscosity and are easily handled, and also represent high reactivity.

As the oxetane compound (D), a commercially available product having a cation-polymerizable monomer as a main component can be used, for example, ARON OXETANE® OXT-121, OXT-221, EXOH, PDX, OXA, OXT-101, OXT-211, and OXT-212 (manufactured by TOAGOSEI CO., LTD.), ETERNACOLL® OXBP, OXTP (manufactured by Ube Industries, Ltd.), or the like may be used.

In addition, the oxetane compound (D) is preferably a compound represented by the following General Formula (4):

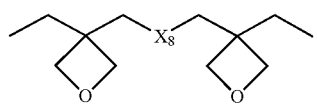

General Formula (4)

In General Formula (4), $X_8$ is a dihydric alcohol residue, or a divalent linking group containing one or more bonds selected from the group consisting of —O—, —C—O—, an ether bond, a carbonate bond, a urethane bond, and a urea bond, and may include an aromatic ring. The divalent compound represented by General Formula (4) is preferred for increasing the modulus of elasticity of the curable resin (A).

The compound represented by General Formula (4) may include a compound exemplified as the dioxetane compound. The commercially available product thereof may include ARON OXETANE® OXT-121, OXT-221 (manufactured by TOAGOSEI CO., LTD.), ETERNACOLL® OXBP (manufactured by Ube Industries, Ltd.), or the like. Among them, in particular, bis[1-ethyl(3-oxetanyl)]methylether is preferred for obtaining the effect of the present invention, in that the compound has an ether bond and flexibility, thereby guaranteeing toughness, and at the same time has a small molecular weight of $X_8$, and can improve crosslinking density. In addition, 4,4'-bis[3-ethyl-(3-oxetanyl)methoxymethyl]biphenyl is preferred in that it has an aromatic ring, has a strong interaction with the aromatic ring of the component (A) of the present invention and the cyclic structure of the component (BI), and improves thermal resistance.

In addition, the oxetane compound (D) is preferably a compound represented by the following General Formula (2):

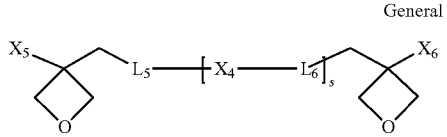

General Formula (2)

The number of the oxetanyl groups of the compound represented by General Formula (2) is not particularly limited. For example, a difunctional oxetane compound having two oxetanyl groups in the molecule, a trifunctional oxetane compound having three oxetanyl groups in the molecule, a tetra- or higher functional oxetane compound having four or more oxetanyl groups in the molecule, or the like may be included, but is not limited thereto. Among them, the difunctional oxetane compound having two oxetanyl groups in the molecule is preferred.

In General Formula (2), $X_4$ is a divalent linking group which is linked by a carbon atom forming an aromatic ring. An example of $X_4$ may include a hydrocarbon group formed of a structure having only one aromatic ring, a hydrocarbon group formed of a structure in which an aromatic ring is bonded by a single bond, a hydrocarbon group formed of a structure in which an aromatic ring is bonded by an aliphatic carbon atom, a hydrocarbon group formed of a structure in which an aromatic ring is bonded by an aliphatic cyclic hydrocarbon group, a hydrocarbon group formed of a structure in which a plurality of benzene rings are polycyclized by condensation, a hydrocarbon group formed of a structure in which an aromatic ring is bonded by an aralkyl group, a hydrocarbon group formed of a structure in which an aromatic ring is bonded by an oxygen atom or a sulfur atom, or the like. A specific example thereof may include a phenylene group, a biphenylene group, a naphthalenediyl group, an anthracenediyl group, a phenanthrenediyl group, a fluorenediyl group, a diphenylmethanediyl group, a diphenylethanediyl group, a diphenylpropanediyl group, a diphenyletherdiyl group, a diphenylsulfonediyl group, a triphenylethanediyl group, a tetraphenylmethanediyl group, or the like, which may be unsubstituted or substituted. An example of the substituent may include a straight chain or branched chain alkyl group having 1 to 6 carbon atoms. Among them, a phenylene group, a biphenylene group, or a diphenylmethanediyl group, which may be substituted, is preferred. $X_4$ may have a group including an oxetanyl group.

$X_5$ and $X_6$ are independently of each other a hydrogen atom or an alkyl group having 1 to 6 carbon atoms. A specific example of the alkyl group having 1 to 6 carbon atoms represented by $X_5$ and $X_6$ may include an acyclic alkyl group such as a methyl group, an ethyl group, an n-propyl group, an isopropyl group, an n-butyl group, an isobutyl group, an s-butyl group, a t-butyl group, a pentyl group, and a hexyl group; a cyclic alkyl group such as a cyclopropyl group, a cyclobutyl group, a cyclopentyl group, and a cyclohexyl group, or the like. Among them, a methyl group and an ethyl group are preferred.

$L_5$ and $L_6$ are independently of each other a divalent linking group containing a bond selected from the group consisting of —O—, —C—O—, an ester bond, and an ether bond. Hereinafter, "the bond selected from the group consisting of —O—, —C—O—, an ester bond, and an ether bond" may sometimes be referred to as "a second specific bond". $L_5$ and $L_6$ may be a linking group which is directly linked to an adjacent group (a methylene group, $X_4$) by the second specific bond, or a linking group which is linked by one or more carbon atoms between the second specific bond and the adjacent group. When the second specific bond is any one of —O— and —C—O—, it is preferred that an oxygen atom of the second specific bond is bonded to a carbon atom interposed between the second specific bond and the adjacent group, or a carbon atom of the adjacent group to form an ether bond. A specific example of $L_5$ and $L_6$ may include the above General Formula (1-a)(1-d), or the like. $L_5$ and $L_6$ may include a group containing an oxetanyl group.

An average value of repeating structural units represented by s is a real number of 0.1 or more and 10 or less, preferably 0.2 or more and 5 or less from the viewpoint of toughness of a cured product, and more preferably 0.5 or more and 3 or less from the viewpoint of the viscosity of the oxetane compound.

As the compound represented by General Formula (2), commercially available products such as ETERNACOLL® OXBP (manufactured by Ube Industries, Ltd.), ETERNACOLL® OXIPA (manufactured by Ube Industries, Ltd.), ARON OXETANE OXT-121 (manufactured by TOAGOSEI CO., LTD.), or the like may be preferably used.

As a specific example of the compound represented by General Formula (2), a compound represented by the following structure is preferred from the viewpoint of compatibility between toughness and a modulus of elasticity.

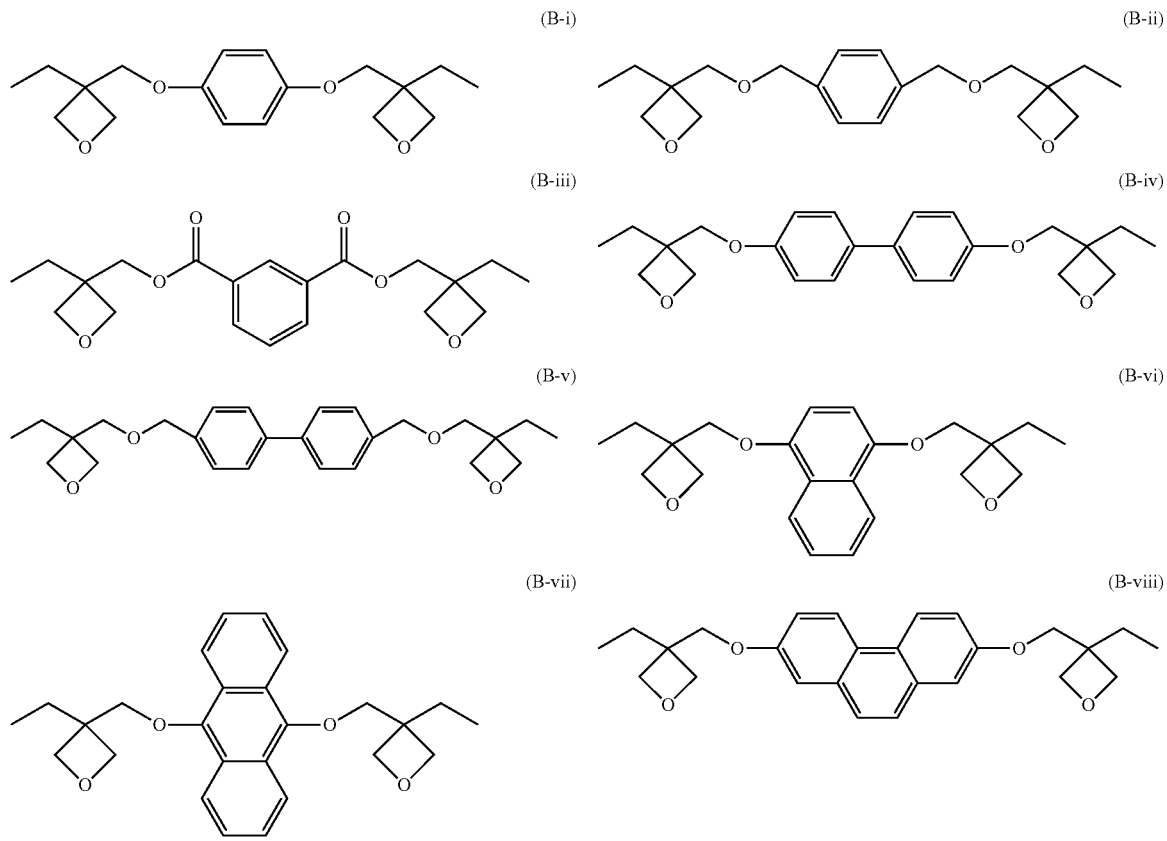

-continued
(B-ix)
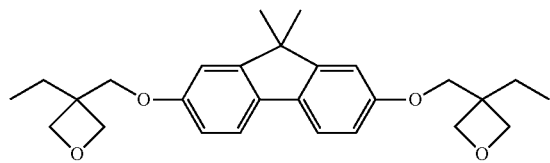
(B-x)
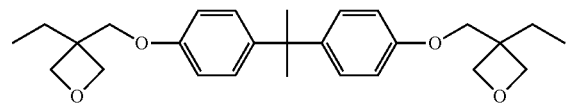
(B-xi)
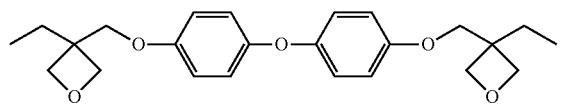
(B-xii)
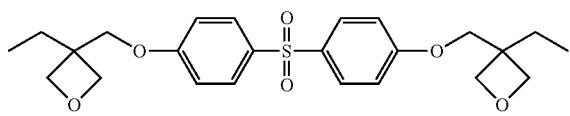
(B-xiii)
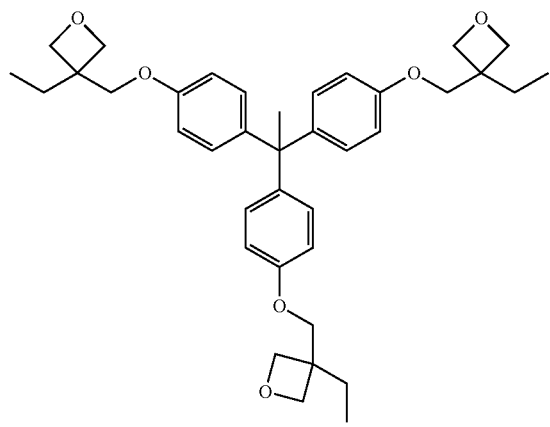
(B-xiv)
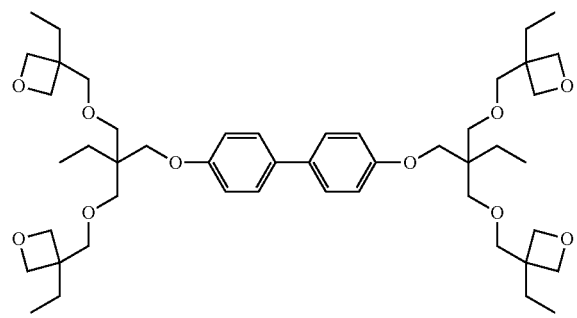
(B-xv)
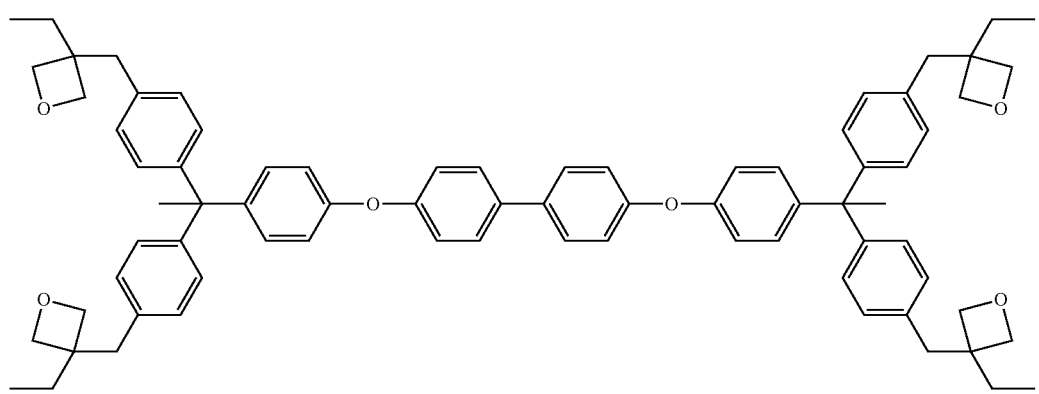
(B-xvi)
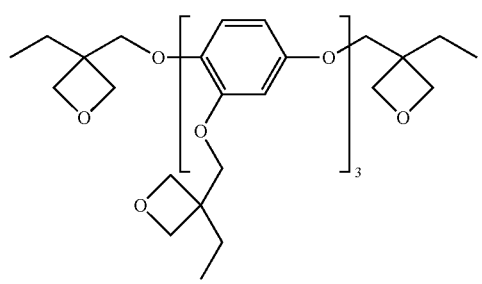

(B-xvii)

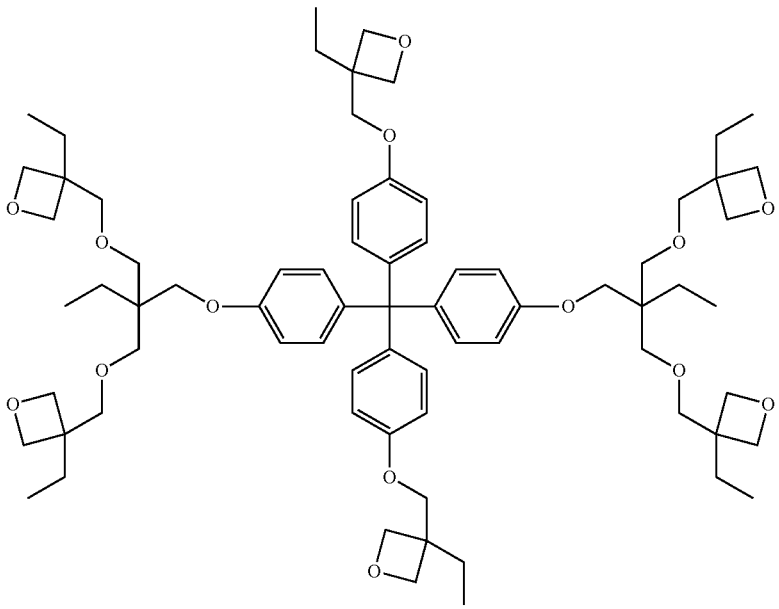

When the resin composition includes the oxetane compound (D), the content is preferably 5 parts by mass or more and 90 parts by mass or less, more preferably 10 parts by mass or more and 80 parts by mass or less, and still more preferably 15 parts by mass or more and 70 parts by mass or less, based on total 100 parts by mass of the component (A) and the component (D). When the content of the oxetane compound (D) is 5 parts by mass or more, a cured product having a sufficient modulus of elasticity is obtained. When the content of the oxetane compound (D) is more than 90 parts by mass, there is a possibility that crosslinking density is increased, and sufficient toughness is not obtained.

<Cation-Polymerizable Compound (E) (Component (E))>

The curable resin composition of the present invention may include, for example, an epoxy resin, or the like as a cation-polymerizable compound other than the component (A) and the component (D).

The epoxy resin other than the component (A) used in the present invention may include a bisphenol A type epoxy resin, a bisphenol F type epoxy resin, a biphenyl type epoxy resin, a tetramethylbiphenyl type epoxy resin, a naphthalene type epoxy resin, a phenol novolac type epoxy resin, a cresol novolac type epoxy resin, a triphenylmethane type epoxy resin, a tetraphenylethane type epoxy resin, a dicyclopentadien-phenol addition reaction type epoxy resin, a phenolaralkyl type epoxy resin, a naphthol novolac type epoxy resin, a naphtholaralkyl type epoxy resin, a naphthol-phenol co-condensation novolac type epoxy resin, a naphthol-cresol co-condensation novolac type epoxy resin, an aromatic hydrocarbon formaldehyde resin modified phenol resin type epoxy resin, a biphenyl modified novolac type epoxy resin, a naphthylene ether type epoxy resin, or the like.

These epoxy resins may be an oligomerised one as a multimer, and though a photocuring resin which can be preferably used in the present invention has a low crystallinity so that it is hard to be solidified, the cured product thereof tends to become hard, and thus, the bisphenol type epoxy resin is preferred. Among the bisphenol type epoxy resins, monomers such as bisphenol A diglycidyl ether or bisphenol F diglycidyl ether are preferred in that the photocuring resin composition has low viscosity.

It is preferred that the epoxy resin of the present invention has an aromatic ring, for improving the hardness of the cured product.

In order to express the effect of the present invention, the content of the cation-polymerizable compound (E) is preferably 0 parts by mass or more and 75 parts by mass or less, based on 100 parts by mass of the component (A) (when the component (D) is included, based on total 100 parts by mass of the component (A) and the component (D)). When the amount of the cation-polymerizable compound (E) is in excess, the effect of the present invention may be impaired.

<Radical Polymerizable Compound (F) (Component (F))>

The curable resin composition of the present invention may include, for example, a (meth)acrylate compound, or the like, as the radical polymerizable compound (F).

The (meth)acrylate compound may be a monofunctional (meth)acrylate compound having one (meth)acryloyl group in the molecule, a polyfunctional (meth)acrylate compound having two or more (meth)acryloyl groups in the molecule, or the like. In the present invention, any polymerizable (meth)acryl compound which can be polymerized by a common method can be used. The monofunctional (meth)acrylate compound and the polyfunctional (meth)acrylate compound may be used by optionally mixing one or more.

The monofunctional (meth)acrylate compound may include methyl(meth)acrylate, ethyl(meth)acrylate, n-butyl(meth)acrylate, isobutyl(meth)acrylate, t-butyl(meth)acrylate, 2-ethylhexyl(meth)acrylate, n-octyl(meth)acrylate, i-octyl(meth)acrylate, lauryl(meth)acrylate, stearyl(meth)acrylate, cyclohexyl(meth)acrylate, isobornyl(meth)acrylate, adamantyl(meth)acrylate, 2-hydroxyethyl(meth)acrylate, 2-hydroxypropyl(meth)acrylate 2-hydroxybutyl(meth)acrylate, 4-hydroxybutyl(meth)acrylate, glycidyl(meth)acrylate, tetrahydroperfuryl(meth)acrylate, phenylglycidyl(meth)acrylate, dimethylaminomethyl(meth)acrylate, phenylcellosolve(meth)acrylate, dicyclopentenyl(meth)acrylate, dicyclopentenyloxyethyl(meth)acrylate, biphenyl(meth)acrylate, 2-hydroxyethyl(meth)acryloylphosphate, phenyl(meth)acrylate, phenoxyethyl(meth)acrylate, phenoxypropyl(meth)acrylate, benzyl(meth)acrylate, or the like.

The polyfunctional (meth)acrylate compound may include ethyleneglycoldi(meth)acrylate, diethyleneglycoldi(meth)acrylate, triethyleneglycoldi(meth)acrylate, tetraethyleneglycoldi(meth)acrylate, nonaethyleneglycoldi(meth)acrylate, 1,3-butyleneglycoldi(meth)acrylate, 1,4 butanedioldi(meth)acrylate, dimethyloltricyclodecanedi(meth)acrylate, trimethylol propanetri(meth)acrylate, neopentylglycoldi(meth)acrylate, 1,6-hexamethylenedi(meth)acrylate, hydroxypyvalicester neopentylglycol di(meth)acrylate, pentaerythritoltri(meth)acrylate, pentaerythritoltetra(meth)acrylate, ditrimethylolpropanetetraacrylate, dipentaerythritoltetra(meth)acrylate, dipentaerythritolpenta(meth)acrylate, dipentaerythritolhexa(meth)acrylate, tris(meth)acryl oxyethylisocyanurate, or the like.

For expressing the effect of the present invention, the content of the radical polymerizable compound (F) is preferably 0 parts by mass or more and 75 parts by mass or less, based on 100 parts by mass of the component (A) (when the component (D) is included, based on total 100 parts by mass of the component (A) and the component (D)). When the amount of the radical polymerizable compound (F) is in excess, the effect of the present invention may be impaired.

<Curable Resin Composition>

In the curable resin composition of the present invention, to the extent that the object and the effect of the present invention are not impaired, various additive materials may be included, as other optional components. Such additive material may include polymers or oligomers such as an epoxy resin, polyamide, polyamideimide, polyurethane, polybutadiene, polychloroprene, polyether, polyester, a styrene-butadiene block copolymer, a petroleum resin, a xylene resin, a ketone resin, cellulose resin, fluorine-based oligomer, silicone-based oligomer, and polysulfide-based oligomer; polymerization inhibitors such as phenothiazine and 2,6-di-t-butyl-4-methylphenol; polymerization initiation aids; leveling agents; wettability improving agents; surfactants; plasticizers; UV absorbers; silane coupling agents; inorganic fillers; pigments; dyes, or the like.

The composition of the present invention can be prepared by placing the essential components (A), (BI) and (C), and if necessary, the component (D) and other optional components in appropriate amounts, in a stirring container, and stirring the components usually at 30° C. or more and 120° C. or less, and preferably at 50° C. or more and 100° C. or less. Here, a stirring time is usually 1 minute or more and 6 hours or less, and preferably 10 minutes or more and 2 hours or less. When the total content of the component (A) and the component (BI) (when the component (D) is included, based on total 100 parts by weight of the component (A), the component (BI), and the component (D)) is preferably 1 part by mass or more and 100 parts by mass or less, more preferably 25 parts by mass or more and 100 parts by mass or less, and still more preferably 75 parts by mass or more and 100 parts by mass or less, based on 100 parts by mass of the curable resin composition except the component (C), whereby the effect of the present invention can be sufficiently obtained.

The viscosity of the composition of the present invention at 25° C. is preferably 50 mPa·s or more and 10,000 mPa·s or less, and more preferably 70 mPa·s or more and 5,000 mPa·s or less.

The composition of the present invention obtained as described above is preferably used as a photocurable resin composition in the method of optically forming a three-dimensional shaped article. That is, by the method of optically forming a three-dimensional shaped article in which the photocurable resin composition of the present invention is selectively irradiated with active energy rays such as an ultraviolet ray, an electron beam, an X-ray and a radiation to supply energy required for curing, a three-dimensional shaped article having a desired shape can be manufactured.

<Cured Product>

The essential components of the composition of the present invention are the curable resin (A), the polyhydric alcohol (BI), and the curing agent (C), which are cured to obtain a cured product. Curing can be performed by any known method such as active energy ray curing or thermal curing, depending on the curing agent included. A curing method may be a combination of plural types.

In the obtained cured product of the present invention, the curable resin (A) has an aromatic ring to have strong interaction between molecules, and when the oxetane compound (D) is included, the oxetane compound (D) has an effect of promoting curing of the curable resin (A). In addition, $X_3$ of the curable resin (A) is a flexible backbone, whereby the backbone can be cured in a bent state, and rigid $X_1$ or $X_2$ can be relatively freely arranged in the cured product. Thus, after curing, the rigid structures of the curable resin (A) are very effectively interacted with each other. In addition, in the case that the component (A) is an epoxy resin, for example, since a protonated epoxy group is labile in the cationic polymerization system, there is a problem in that a polymerization chain is hard to grow. In the present invention, it is considered that an appropriate amount of the polyhydric alcohol (BI) is added to the resin composition to allow the unreacted epoxy group to be reacted, whereby polymer chains are extended. In addition, interaction by a hydrogen bond of the curable resin (A) or the oxetane compound (D) with an oxygen atom is effectively generated, thereby improving toughness. In addition, it is considered that due to the effect of the physical crosslinking by the extension of polymer chains and the hydrogen bond, the polymer chains cannot move freely with each other to improve a modulus of elasticity. Thus, it is considered therefrom that though the modulus of elasticity and the toughness are usually conflicting physical properties, characteristic curing to allow the two conflicting physical properties to be compatible with each other can be exerted.

<Method of Manufacturing a Three-Dimensional Shaped Article>

The curable resin composition according to the present embodiment can be preferably used in the method of manufacturing a three-dimensional shaped article by a method of optically forming a three-dimensional shaped article (optical shaping method). Hereinafter, the method of manufacturing a three-dimensional shaped article using the curable resin composition according to the present embodiment will be described.

As the optical shaping method, a known method can be used. That is, the method of manufacturing a three-dimensional shaped article of the present embodiment includes a step of selectively irradiating the liquid curable resin composition of the present embodiment with an activate energy ray such as light to cure, for example, photocuring the curable resin composition by layer, and repeating this step to manufacture the three-dimensional shaped article.

In the step of curing the curable resin composition layer by layer, the curable resin composition is selectively irradiated with active energy ray, based on a slice data of the three-dimensional shaped article to be created. The active energy ray with which the curable resin composition is irradiated is not particularly limited, as long as it is an active energy ray capable of curing the curable resin composition according to the present embodiment. A specific example of the active energy ray may include electromagnetic waves such as an ultraviolet ray, a visible ray, an infrared ray, an X-ray, a gamma ray, and a laser beam, and particle beams such as an alpha ray, a beta ray, and an electron beam. Among them, from the viewpoint of the absorption wavelength of the curing agent (C) to be used and the cost of equipment installation, the ultraviolet ray is most preferred. As the light source at this time, an ultraviolet ray laser (e.g., Ar laser, He—Cd laser, etc.), a mercury lamp, a xenon lamp, a halogen lamp, a fluorescent lamp, or the like may be used. Among them, the laser light source is preferably adopted in that it raises an energy level to shorten a shaping time, and furthermore, has an excellent light collecting property to obtain high shaping precision. A light exposure amount is not particularly limited, however, preferably 0.001 J/cm$^2$ or more and 10 J/cm$^2$ or less. When the amount is less than 0.001 J/cm$^2$, the curable resin composition may not be sufficiently cured, and when the amount is more than 10 J/cm$^2$, the irradiation time is extended to decrease productivity.

A method of irradiating the curable resin composition with the active energy ray is not particularly limited, and for example, when light is emitted as the active energy ray, the following methods may be adopted. A first method is to use spot-like collected light such as laser light to two-dimensionally scan the curable resin composition. Here, the two-dimensional scanning may be in a point drawing manner, or a line drawing manner. A second method is a face exposure method to use a projector to irradiate a shape of a section data with light. In this case, through a planar drawing mask formed by arranging a plurality of micro-optical shutters such as a liquid crystal shutter or a digital micromirror shutter, the active energy ray may be planarly emitted.

A representative example of the optical shaping method is described as follows. First, a supporting stage which is provided to freely move up and down in a storage container is lowered (sunk) in a small amount, thereby supplying a resin composition on the supporting state, and forming a thin layer 1. Then, on this thin layer 1, light is selectively irradiated to form a solid phase cured resin layer 1. Then, on this cured resin layer 1, the curable resin composition is supplied to form a thin layer 2, and the thin layer 2 is selectively irradiated with light, thereby forming a new cured resin layer 2 which is integrally laminated continuously on the cured resin layer 1. Further, this step is repeated a predetermined number of times with a pattern to be light-emitted being changed or not, whereby the three-dimensional shaped article which is formed by integrally laminating a plurality of cured resin layers (1, 2, . . . n) is shaped.

The thus-obtained three-dimensional shaped article is taken out of the storage container, the unreacted curable resin composition remaining on the surface of the container is removed, and if necessary, the article is cleaned. Here, as the cleaning agent, alcohol-based organic solvents represented by alcohols such as isopropylalcohol and ethylalcohol; ketone-based organic solvents represented by acetone, ethyl acetic acid, methylethylketone, or the like; and aliphatic organic solvents represented by terpenes may be used. In addition, after cleaning the article with a cleaning agent, if necessary, post-curing may be performed by light irradiation or thermal irradiation. Post-curing can cure the unreacted curable resin composition which may remain on the surface or in the three-dimensional shaped article, thereby suppressing stickiness of the shaped surface, and also improving initial strength of the shaped article.

EXAMPLES

Hereinafter, Examples are provided to illustrate the present invention in detail, however, the present invention is not limited to the Examples.

Example 1

According to the following prescription, each component was added to a light-shielded bin, and stirred using a stirring defoamer until the components are uniform, thereby preparing a curable composition.

Component (A): 70 parts by mass of curable resin A-i (n=1) (manufactured by DIC Corporation 'EXA4816' (purity of 99%))

Component (BI): 6 parts by mass of 1,4-benzenedimethanol

Component (C): 2 parts by mass of a photoacid generator 'CPI-210S' (manufactured by San-Apro Ltd.)

Component (D): 30 parts by mass of an oxetane compound represented by the following formula (manufactured by TOAGOSEI CO., LTD. 'OXT-221'):

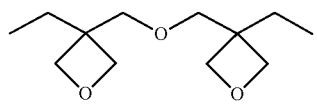

[Creation of Cured Product and Evaluation of Mechanical Properties]

Creation of film type specimen (for evaluating modulus of elasticity) A cured product was manufactured by the following method, using the prepared curable composition. First, a spacer of 300 μm was interposed between two sheets of quartz glass, and the curable composition was flowed into the gap having a width of 300 μm. The flowed curable composition was irradiated with an ultraviolet ray at 5 mW/cm$^2$ for 300 seconds (total energy of 1500 mJ/cm$^2$) with an ultraviolet ray irradiator (manufactured by HOYA CANDEO OPTRONICS, product name: 'LIGHT SOURCE EXECURE 3000') to obtain a photocured product. The thus-obtained cured product was heat-treated in a heating oven at 50° C. for 1 hour, and in a heating oven at 100° C. for 2 hours, thereby obtaining a cured product.

Creation of Columnar Specimen (for Evaluating Toughness)

A cured product was manufactured by the following method, using the prepared curable composition. First, a mold having a length of 80 mm, a width of 10 mm, and a thickness of 4 mm was interposed between two sheets of quartz glass, and the curable resin was flowed thereinto. The flowed curable composition was irradiated with an ultraviolet ray at 5 mW/cm$^2$ from both surfaces of the mold for 120 seconds with the ultraviolet ray irradiator which was used in the creation of the film type specimen, thereby performing temporary curing. Thereafter, an ultraviolet ray was emitted again from the both surfaces for 600 seconds each time to perform main curing, thereby obtaining a photocured product (total energy of 7200 mJ/cm$^2$). The thus-obtained cured product was heat-treated in a heating oven at 50° C. for 1 hour, and in a heating oven at 100° C. for 2 hours, thereby obtaining a cured product.

Measurement and Evaluation of Modulus of Elasticity (Test Method of Tensile Property)

The thus-obtained photo-thermal cured product having a thickness about 300 μm was punched into a No. 8 type dumbbell shape to manufacture a specimen. For this specimen, according to JIS K 7127, a tensile testing machine (product name: STROGRAPH EII, manufactured by Toyo Seiki Seisaku-sho, Ltd.) was used to measure a tensile modulus as an indicator of rigidity, at a test temperature of 23° C., at a tensile speed of 10 mm/min. The results are shown in Table 1.

Measurement and Evaluation of Toughness (Method of Obtaining Charpy Impact Property)

For the thus-obtained specimen having a length of 80 mm, a width of 10 mm, and a thickness of 4 mm, according to JIS K 7111, a cutout (notch) having a depth of 2 mm at 45° was placed in the center of the specimen, with a notch forming machine (manufactured by Toyo Seiki Seisaku-sho, Ltd., product name: NOTCHING TOOL A-4). Thereafter, an impact testing machine (manufactured by Toyo Seiki Seisaku-sho, Ltd., product name: 'IMPACT TESTER IT') was used to destroy the specimen from the rear of the cutout of the specimen with energy of 2 J. The energy required for destruction was calculated from the angle at which the hammer which was swung up to 150° was swung down after destruction of the specimen, and was used as an indicator of toughness. The results are shown in Table 1.

Examples 2 to 5, and Comparative Examples 1 and 2

A curable composition was prepared in the same manner as in Example 1, except that the content of each component and the number of hydroxyl groups of the component (BI) were changed as shown in Table 1, and evaluation was performed in the same manner as in Example 1. The results are shown in Table 1. In addition, the components (BI) used in each of the Example and Comparative Examples are as follows:

Example 2: 1, 6-hexanediol
Example 3: trimethylolpropane
Example 4: erythritol
Example 5: erythritol
Comparative Example 2: mannitol

TABLE 1

| | | Examples | | | | | Comparative Examples | |
|---|---|---|---|---|---|---|---|---|
| | | 1 | 2 | 3 | 4 | 5 | 1 | 2 |
| Component (A) | Content ratio [part by mass] | 70 | 70 | 70 | 70 | 96 | 70 | 70 |
| Component (B) | Number of hydroxyl group | 2 | 2 | 3 | 4 | 4 | — | 6 |
| | Content ratio [part by mass] | 6 | 5 | 4 | 3 | 3 | 0 | 3 |
| Component (C) | Content ratio [part by mass] | 2 | 2 | 2 | 2 | 2 | 2 | 2 |
| Component (D) | Content ratio [part by mass] | 30 | 30 | 30 | 30 | 30 | 30 | 30 |
| Toughness [kJ/m$^2$] | | 4.8 | 5.5 | 4.9 | 4.6 | 6.9 | 2.5 | 1.1 |
| Modulus of elasticity [GPa] | | 1.86 | 1.82 | 1.73 | 1.59 | 1.44 | 1.35 | 1.48 |

It was confirmed that as compared with Comparative Example 1 to which a polyhydric alcohol was not added, a toughness value and a modulus of elasticity were improved in Examples 1 to 5. In addition, in the case that a polyhydric alcohol having two hydroxyl groups was used (Examples 1 and 2), a system to which an oxetane compound (D) was added had the highest toughness value and modulus of elasticity. In addition, even in Example 5 to which the oxetane compound (D) was not added, a cured product having sufficient toughness and modulus of elasticity was able to be manufactured. When the number of hydroxyl groups of the polyhydric alcohol was 6 (Comparative Example 2), the toughness value was decreased to approximately half, as compared with the case that the polyhydric alcohol was not added (Comparative Example 1).

Second Embodiment

The curable resin composition according to a second embodiment includes:
(A) a curable resin represented by the following General Formula (1):

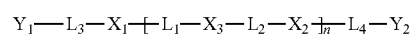

General Formula (1)

where
X$_1$ and X$_2$ are independently of each other a divalent linking group containing an aromatic ring,
X$_3$ is an alkylene group having 4 to 18 carbon atoms, in which the carbon atom forming the alkylene group may be substituted by an oxygen atom, a sulfur atom, a nitrogen atom, or a silicon atom,
L$_1$, L$_2$, L$_3$, and L$_4$ are independently of one another divalent linking group containing one or more bonds selected from the group consisting of —O—, —C—O—, —S—, —C—S—, ester bond, urethane bond, ether bond, thiourethane bond, and thioether bond,
Y$_1$ and Y$_2$ are independently of each other an epoxy group, a cycloalkene oxide group, or an oxetanyl group, and
n is an average value of repeating structural units, and a real number of 0.1 or more and 10 or less;
(BII) a cyclic compound having 3 to 6 reactive groups and a reactive group equivalent of 100 g/eq or more and 300 g/eq or less; and
(C) a curing agent.

<Curable Resin (A) (Component (A))>

As a curable resin (A) used in the present embodiment, the curable resin (A) described in the first embodiment can be used. The preparation method of the curable resin (A) also follows the preparation method of the curable resin (A) of the first embodiment.

The content of the curable resin (A) is preferably 50 parts by mass or more and 97 parts by mass or less, based on total 100 parts by mass of the component (A) and the component (BII) (when the component (D) is included, based on total 100 parts by mass of the component (A), the component (BII), and the component (D)), since the effect of improving toughness of a cured product is large. In addition, for having a good balance between thermal resistance and toughness, and preferred hardness of the cured product, the content of 65 parts by mass or more and 97 parts by mass or less is more preferred.

<Cyclic Compound (BII) (Component (BII))>

A cyclic compound (BII) has 3 to 6 reactive groups, and a reactive group equivalent of 100 g/eq or more and 300 g/eq or less. The cyclic compound (BII) is a compound having one or a plurality of cyclic structures in the molecule.

An example of the reactive group may include an epoxy group, a cycloalkene oxide group, an oxetanyl group, or the like, and may be used in combination of two or more reactive groups. As the reactive group, an epoxy group is preferred, in terms of ease of availability. The number of the reactive groups is 3 or more and 6 or less, preferably 3 or more and 4 or less, and more preferably 3. When the number of the reactive groups is 2 or less, the effect of increasing crosslinking density is low, and also the effect of improving thermal resistance is low. When the number of the reactive groups is 7 or more, the crosslinking density is excessively increased, thereby causing significant deterioration of toughness.

The reactive group equivalent of the cyclic compound (BII) is 100 g/eq or more and 300 g/eq or less, preferably 125 g/eq or more and 220 g/eq or less, and more preferably 125 g/eq or more and 210 g/eq or less. Within the range of the reactive group equivalent, the cured product of the resin composition of the present invention has a suppressed increase of crosslinking density, and due to an increased molecular weight between crosslinking points, a molecular chain between crosslinking points has a room to move upon impact, thereby having improved impact resistance and good toughness. As a result, improvement of thermal resistance and toughness by a crosslinked structure can be compatible. Here, the reactive group equivalent refers to a value representing a molecular weight per one reactive group. For example, when an epoxy group is the reactive group, it is called an epoxy equivalent. The reactive group equivalent can be calculated using a known method such as a method of calculating the epoxy equivalent of an epoxy resin (JISK7236).

In addition, by having the reactive group equivalent of 100 g/eq or more and 300 g/eq or less and 3 to 6 reactive groups, the cured product of the composition has a large increase of the molecular weight of the resin after cured, and at the same time, has a large effect of entanglement of molecular chains, thereby having a large effect of improvement in thermal resistance.

An example of the cyclic structure of the cyclic compound (BII) may include a monocyclic or polycyclic aromatic ring, a cyclic aliphatic hydrocarbon, a heterocyclic structure such as an isocyanurate ring, or the like, and a rigid cyclic structure such as an aromatic ring and an isocyanurate ring is preferred. This cyclic structure has low motility at high temperature, and a large effect of improving thermal resistance of a cured product. In addition, this cyclic structure has strong interaction between molecules, and may suppress a decrease of thermal resistance, even in the case that crosslinking density is substantially reduced. It is considered that by this effect, the cured product can express high thermal resistance and toughness. In particular, when the compound has 1 to 6 cyclic structures, the effect of thermal resistance is large, and at the same time, the effect of lowering toughness is lowered, which is thus preferred.

The cyclic compound (BII) may include specifically a compound having an aromatic ring as a cyclic structure. For example, compounds having a reactive group introduced to the hydroxyl group of 4,4',4''-trihydroxytriphenylmethane, 1,1,1-tris(4-hydroxyphenyl)ethane, or 1,1,2,2-tetrakis(p-hydroxyphenyl)ethane, and the like may be included. As a commercially available product, TECHMORE VG3101 (manufactured by Printec Corporation) (a reactive group equivalent of 210 g/eq) which is obtained by reacting 1,1,1-tris(4-hydroxyphenyl)ethane with epichlorohydrin, or the like may be preferably used.

In addition, the cyclic compound (BII) may include specifically a compound having an isocyanurate ring as a cyclic structure. For example, tris(2,3-epoxypropyl) isocyanurate, tris(3,4-epoxybutyl) isocyanurate, tris(4,5-epoxypentyl) isocyanurate, tris(5,6-epoxyhexyl) isocyanurate, or the like may be included. As a commercially available product, TEPIC®-VL (a reactive group equivalent of about 135 g/eq), TEPIC®-UL (a reactive group equivalent of about 195 g/eq, or TEPIC®-FL (a reactive group equivalent of about 175 g/eq) (manufactured by Nissan Chemical Corporation) can be preferably used.

In addition, as the cyclic compound (BII), an example of a compound having an oxetanyl group may include the following compounds:

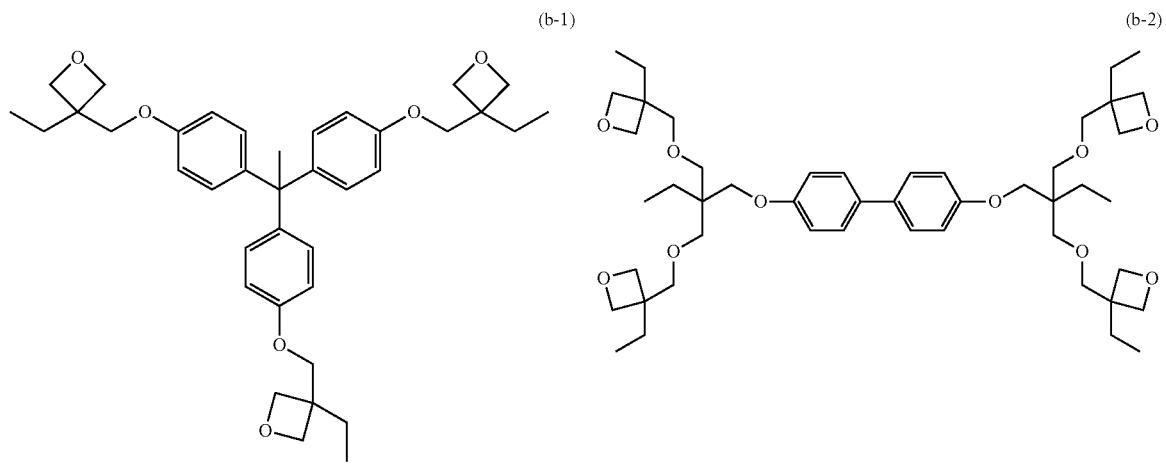 [SMILES: CCC1(COc2ccc(C(C)(c3ccc(OCC4(CC)COC4)cc3)c3ccc(OCC4(CC)COC4)cc3)cc2)COC1 ; CCC1(COCC(CC)(COCC2(CC)COC2)COc2ccc(-c3ccc(OCC(CC)(COCC4(CC)COC4)COCC4(CC)COC4)cc3)cc2)COC1]

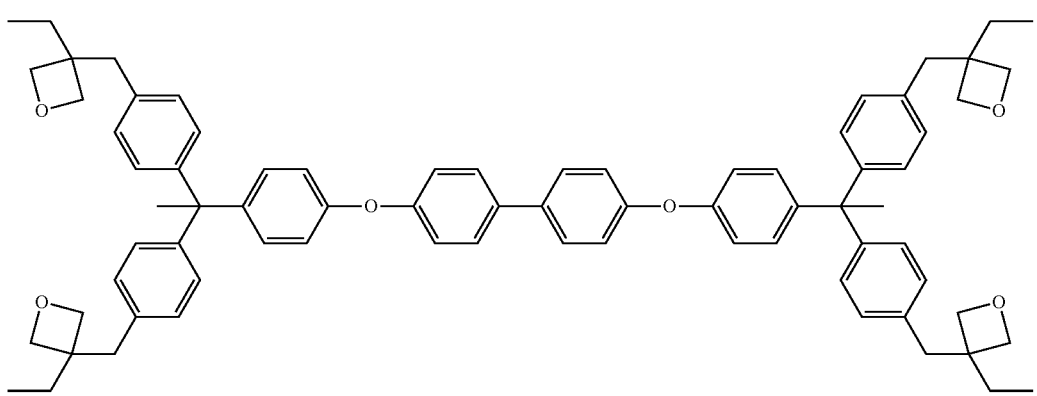

(b-3)

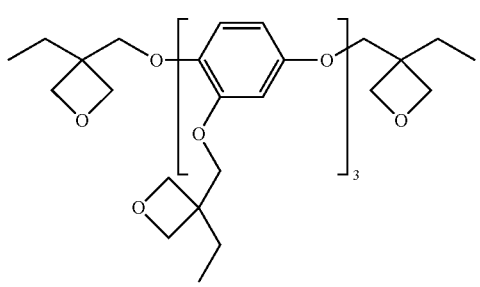

(b-4)

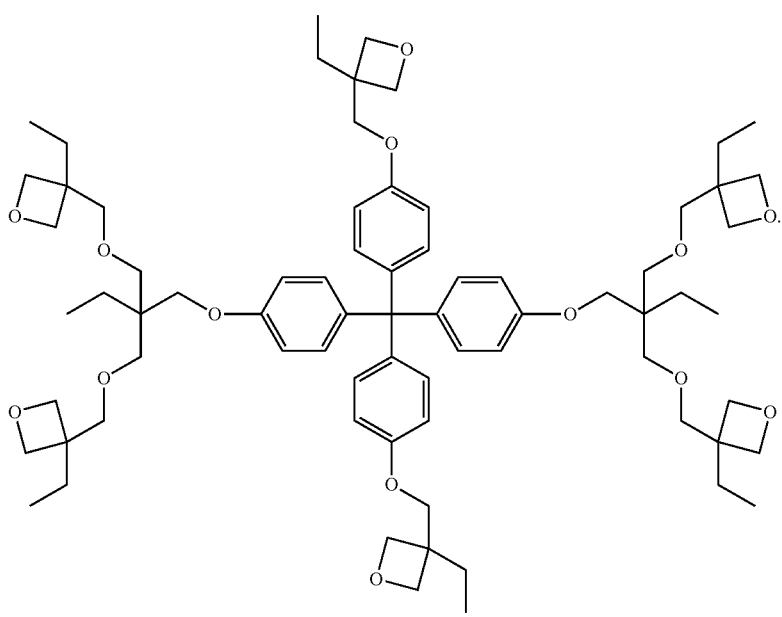

(b-5)

The content of the cyclic compound (BII) is preferably 3 parts by mass or more and 50 parts by mass or less, based on total 100 parts by mass of the component (A) and the component (BID (when the component (D) is included, based on total 100 parts by mass of the component (A), the component (BII), and the component (D)), since the thermal resistance and hardness of a cured product are improved. In addition, since the toughness of the cured product is not impaired, the content of 5 parts by mass or more and 40 parts by mass or less is more preferred. In addition, when the cyclic compound (BII) is included at 10 parts by mass or more and 35 parts by mass or less, the crosslinking density of the cured product can be preferably adjusted, and high thermal resistance and toughness can be expressed. When the cyclic compound (BII) is included at 10 parts by mass or more and 30 parts by mass or less, higher toughness can be expressed and therefore, it is more preferable.

<Curing Agent (C) (Component (C))>

As a curing agent (C), a cation-polymerizable initiator such as a photoacid generator, a photobase generator, or a thermal acid generator can be used. To the extent that the effect of the present invention is not impaired, the curing agent may be used alone or in combination of two or more. When the three-dimensional shaped article is formed by photocuring, due to the stability over time of the curable resin composition of the present invention, or a restriction of a three-dimensional shaping method, it is preferred to use a photoacid generator or a photobase generator, and it is particularly preferred to use a photoacid generator. In addition, other curing agents such as a radical polymerization initiator, for example, a thermal latent curing agent may be included as the curing agent (C).

[Cationic Polymerization Initiator]
(Photoacid Generator)

An example of a photoacid generator is a photocation-polymerizable initiator which generates an acid capable of initiating cationic polymerization by, for example, irradiation with an energy ray such as an ultraviolet ray. When the photoacid generator is used as a curable resin for three-dimensional shaping, it is preferred to use the photocation-polymerizable initiator.

The photocation-polymerizable initiator can be used by appropriately selecting one among the photocation-polymerizable initiators described as the photoacid generator in the first embodiment.

The added amount of the photoacid generator is preferably 0.1 parts by mass or more and 15 parts by mass or less, and more preferably 0.1 parts by mass or more and 10 parts by mass or less, based on total 100 parts by mass of the component (A) and the component (BII) (when the component (D) is included, based on total 100 parts by mass of the component (A), the component (BII), and the component (D)). When the amount of the photoacid generator is small, polymerization tends to be insufficient. When the amount of the initiator is large, a light transmittance is lowered, and polymerization may become heterogeneous.

(Photobase Generator)

A photobase generator can be used by selecting one among the photocation-polymerizable initiators described in the first embodiment as the photobase generator.

The added amount of the photobase generator is preferably 0.1 parts by mass or more and 15 parts by mass or less, and more preferably 0.1 parts by mass or more and 10 parts by mass or less, based on total 100 parts by mass of the component (A) and the component (BII) (when the component (D) is included, based on total 100 parts by mass of the component (A), the component (BII), and the component (D)). When the amount of the photobase generator is small, polymerization tends to be insufficient.

(Thermal Acid Generator)

A thermal acid generator can be also used by selecting one among the photocation-polymerizable initiators described as the thermal acid generator in the first embodiment.

The added amount of the thermal acid generator is preferably 0.1 parts by mass or more and 15 parts by mass or less, and more preferably 0.1 parts by mass or more and 10 parts by mass or less, based on total 100 parts by mass of the component (A) and the component (BII) (when the component (D) is included, based on total 100 parts by mass of the component (A), component (BII), and component (D)). When the amount of the thermal acid generator is small, polymerization tends to be insufficient.

[Radical Polymerization Initiator]

In the case that the resin composition according to the present embodiment includes in particular the radical polymerizable compound (F) as described below, a radical polymerization initiator may be included. Even in the present embodiment, the radical polymerization initiator which is the same as the first embodiment may be used.

The added amount of the photoradical polymerization initiator is preferably 0.1 parts by mass or more and 15 parts by mass or less, and more preferably 0.1 parts by mass or more and 10 parts by mass or less, based on 100 parts by mass of the radical polymerizable compound (F). When the amount of the photoradical polymerization initiator is small, polymerization tends to be insufficient. When the amount of the initiator is large, a light transmittance is lowered, and polymerization may become heterogeneous.

In addition, the added amount of the thermal radical polymerization initiator is preferably 0.1 parts by mass or more and 15 parts by mass or less, and more preferably 0.1 parts by mass or more and 10 parts by mass or less, based on 100 parts by mass of the radical polymerizable compound (F). When the polymerization initiator is added in excess, the molecular weight is not increased, and the physical properties may be lowered.

[Other Curing Agents]

As the curing agent (C), a thermal latent curing agent described in the first embodiment can be used.

The added amount of other curing agents is preferably 0.1 parts by mass or more and 75 parts by mass or less, and more preferably 5 parts by mass or more and 30 parts by mass or less, based on total 100 parts by mass of the component (A) and the component (BII) (when the component (D) is included, based on total 100 parts by weight of the component (A), component (BII), and component (D)). When the amount of the thermal latent polymerization initiator is small, polymerization tends to be insufficient, and when the amount is too large, a crosslinking reaction proceeds, causing deterioration of toughness.

<Oxetane Compound (D) (Component (D))>

It is preferred that the curable resin composition of the present invention includes an oxetane compound other than the component (A) and component (BII).

The oxetane compound (D) may be composed of only one kind of oxetane compound, or plural kinds of oxetane compounds. The oxetane compound is not particularly limited as long as the compound has an oxetanyl group. The number of the oxetanyl groups in the oxetane compound (D) is not particularly limited. For example, a monofunctional oxetane compound having one oxetanyl group in the molecule, a difunctional oxetane compound having two oxetanyl groups in the molecule, a trifunctional oxetane compound having three oxetanyl groups in the molecule, a tetra- or higher functional oxetane compound having four or more oxetanyl groups in the molecule, or the like, may be included, but is not limited thereto. In addition, as the oxetane compound (D), an oxetane compound having an aromatic ring or an ether bond in the molecule may be used. Among them, in particular, the difunctional oxetane compound or the monofunctional oxetane compound having no aromatic ring is preferred.

As a specific example of the oxetane compound (D), the oxetane compound (D) described in the first embodiment can be identically used.

Among them, since the oxetane compound (D) improves thermal resistance, like the first embodiment, the compound represented by General Formula (2) or General Formula (4) described above is preferred.

However, in the present embodiment, since the compound wherein in the above General Formula (2), $L_5$ or $L_6$ has a group including an oxetanyl group corresponds to the component (B), the compound is excluded from the component (D). Therefore, the compounds described in (B-xiii) to (B-xvii) are excluded from the preferred oxetane compound (D) in the present embodiment.

The content of the oxetane compound (D) is preferably 0 parts by mass or more and 90 parts by mass or less, based on total 100 parts by mass of the component (A), the component (BII), and the component (D), from the viewpoint of an effect of reaction promotion of the curable resin (A). By adding the oxetane compound, effects of decreasing the viscosity of the resin composition of the present invention, and increasing a handling property occur. In addition, by containing 5 parts by mass or more and 30 parts by mass or less, the cured product has a growing molecular weight and appropriate crosslinking density, thereby expressing excellent toughness and thermal resistance.

<Cation-Polymerizable Compound (E) (Component (E))>

The curable resin composition of the present embodiment may include, for example, an epoxy resin, or the like, as a cation-polymerizable compound other than the component (A), the component (BII), and the component (D).

The epoxy resin which may be used in addition to the component (A) and the component (BII), used in the present embodiment, and the preferred epoxy resin are identical to those of the first embodiment.

For expressing the effect of the present invention, the content of the cation-polymerizable compound (E) is preferably 0 parts by mass or more and 75 parts by mass or less, based on total 100 parts by mass of the component (A) and the component (BII) (when the component (D) is included, based on total 100 parts by mass of the component (A), the component (BII), and the component (D)). When the amount of the cation-polymerizable compound (E) is in excess, the effect of the present invention may be impaired.

<Radical Polymerizable Compound (F) (Component (F))>

The curable resin composition of the present embodiment may include a compound described as the component (F) in the first embodiment, as a radical polymerizable compound (F).

For expressing the effect of the present invention, the content of the radical polymerizable compound (F) is preferably 0 parts by mass or more and 75 parts by mass or less, based on total 100 parts by mass of the component (A) and the component (BII) (when the component (D) is included, based on total 100 parts by mass of the component (A), the component (BII), and the component (D)). When the amount of the radical polymerizable compound (F) is in excess, the effect of the present invention may be impaired.

<Other Components>

The curable resin composition of the present embodiment may include various additives as other optional components, to the extent that the object and the effect of the present invention are not impaired. The additives may include resins such as an epoxy resin, polyurethane, polybutadiene, polychloroprene, polyester, a styrene-butadiene block copolymer, polysiloxane, a petroleum resin, a xylene resin, a ketone resin, and a cellulose resin; or engineering plastics such as polycarbonate, modified polyphenylene ether, polyamide, polyacetal, polyethylene terephthalate, polybutylene terephthalate, ultra high molecular polyethylene, polyphenylsulfone, polysulfone, polyarylate, polyetherimide, polyetheretherketone, polyphenylene sulfide, polyethersulfone, polyamideimide, a liquid crystal polymer, polytetrafluoroethylene, polychlorotrifluoroethylene, and polyfluorovinylidene; reactive monomers such as a fluorine-based oligomer, a silicone-based oligomer, a polysulfide-based oligomer, a fluorine-containing monomer, and a siloxane structure-containing monomer; soft metals such as gold, silver, and lead; layered crystal structure materials such as graphite, molybdenum disulfide, tungsten disulfide, boron nitride, graphite fluoride, calcium fluoride, barium fluoride, lithium fluoride, silicon nitride, and molybdenum selenide; polymerization inhibitors such as phenothiazine and 2,6-di-t-butyl-4-methylphenol; photosensitizers such as a benzoin compound, an acetophenone compound, an anthraquinone compound, a thioxantone compound, a ketal compound, a benzophenone compound, a tertiary amine compound, and a xantone compound; a polymerization initiation aids, a leveling agent, a wettability improver, a surfactant, a plasticizer, an ultraviolet absorbent, a silane coupling agent, an inorganic filler, a pigment, a dye, an antioxidant, a flame retardant, a thickener, a defoamer, and the like.

<Curable Resin Composition>

The composition of the present invention can be prepared by placing the components (A), (BII), and (C), and if necessary, the component (D) and other optional components in appropriate amounts in a stirring container, and stirring the components usually at 30° C. or more and 120° C. or less, and preferably 50° C. or more and 100° C. or less. The stirring time herein is usually 1 minute or more and 6 hours or less, and preferably 10 minutes or more and 2 hours or less. The content of the sum of the component (A) and the component (BII) (when the component (D) is included, the sum of the component (A), the component (BII), and the component (D)) is preferably 1 part by mass or more and 100 parts by mass or less, more preferably 25 parts by mass or more and 100 parts by mass or less, and still more preferably 75 parts by mass or more and 100 parts by mass or less, based on 100 parts by mass of the curable resin composition except the component (C), thereby sufficiently obtaining the effect of the present invention.

The viscosity of the composition of the present invention at 25° C. is preferably 50 Pa·s or more and 10,000 mPa·s or less, and more preferably 70 mPa·s or more and 5,000 mPa·s or less.

The composition of the present invention obtained as described above is preferably used as a photocurable resin composition in a method of optically forming a three-dimensional shaped article. That is, by the method of optically forming a three-dimensional shaped article in which the photocurable resin composition of the present invention is selectively irradiated with an active energy ray such as an ultraviolet ray, an electron beam, an X-ray, and a radiation to supply energy required for curing, a three-dimensional shaped article having a desired shape can be manufactured.

<Cured Product>

The composition of the present invention has the curable resin (A), the cyclic compound (BII), and the curing agent (C) as an essential component, and the components are cured to obtain a cured product. As a curing method, any known method such as active energy ray curing and thermal curing may be used, depending on a curing agent contained in the composition. The curing method may be a combination of plural types.

In the thus-obtained cured product of the present invention, the curable resin (A) has an aromatic ring, whereby intermolecular interaction is strong, and the cyclic compound (BII) exerts strong intermolecular interaction by a cyclic structure. In addition, $X_3$ of the curable resin (A) is a flexible backbone, whereby the backbone may be cured in a bent state, and rigid $X_1$ or $X_2$ can be relatively freely arranged in the cured product. Thus, after curing, interaction of a rigid structure of the curable resin (A) and a cyclic structure of the cyclic compound (BII) occurs very effectively. It is considered that by having a structure which allows the intermolecular interaction to effectively occur, the cured product obtained by curing the curable resin composition of the present invention including the curable resin (A) and the cyclic compound (BII) exerts a characteristic effect that thermal resistance and toughness which are usually conflicting physical properties are compatible. In addition, when the curable resin (A) has a bond selected from the group consisting of —O—, —C—O—, —S—, —C—S—, an ether bond, and a thioether bond as in General Formulae (1-d) to (1-g), rigid $X_1$ or $X_2$ takes more free arrangement more easily in the cured product. Thus, the effect of thermal resistance and toughness being compatible can be improved.

In addition, by combining the difunctional curable resin (A) and the polyfunctional cyclic compound (BII), the crosslinking density of the cured product is preferably controlled, while taking a network structure, thereby reinforcing the interaction of the component (A) and the component (BII) to contribute compatibility between thermal resistance and toughness.

When the oxetane compound (D) is included, copolymerization of the oxetane compound (D) with the curable resin (A) and the cyclic compound (BII) occurs to increase the molecular weight of the cured product, and adhesion strength at a microdomain interface occurring during polymerization increases, thereby suppressing degradation of mechanical physical properties caused by the microdomain. This effect becomes significant particularly when the compound is the difunctional oxetane compound represented by General Formula (2).

The curable resin composition of the present invention includes a photoacid generator or a photobase generator as the curing agent (C), thereby being preferably used in an optical shaping method.

EXAMPLES

Hereinafter, the present invention will be described in detail by the following Examples, however, the present invention is not limited to the Examples.

[Materials]

Hereinafter, materials used in the Examples and Comparative Examples will be listed.

<Curable Resin (A)>

A1: EPICLON EXA-4816 (manufactured by DIC Corporation, containing 99% of a compound represented by the above Formula (A-i) where n=1)

<Cyclic Compound (BII)>

BII-1: TECHMORE VG3101 (manufactured by Printec Corporation, a reactive group equivalent of 210 g/eq, containing 95% or more of a compound represented by the following General Formula (6))

General Formula (6)

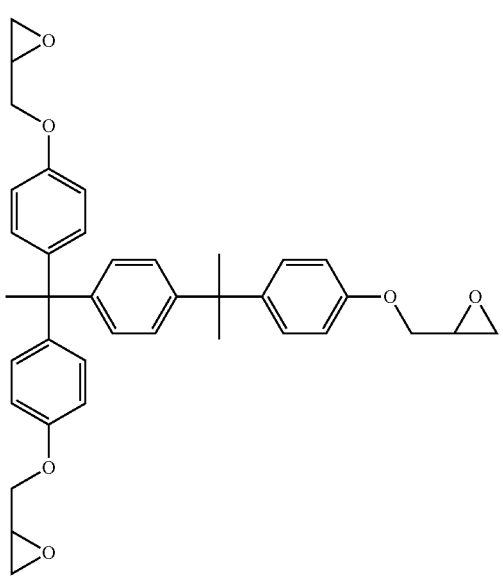

BII-2: TEPIC®-VL (manufactured by Nissan Chemical Corporation, containing 98% of a compound represented by the following General Formula (7), a reactive group equivalent of about 135 g/eq)

General Formula (7)

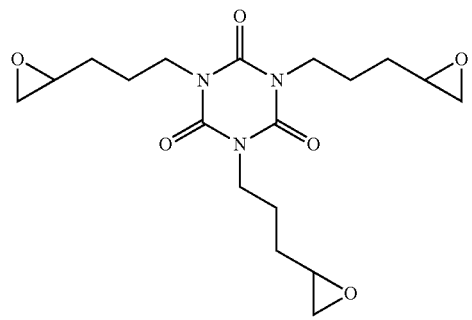

BII-3: TEPIC®-UL (manufactured by Nissan Chemical Corporation, a reactive group equivalent of about 195 g/eq, represented by the following General Formula (8))

General Formula (8)

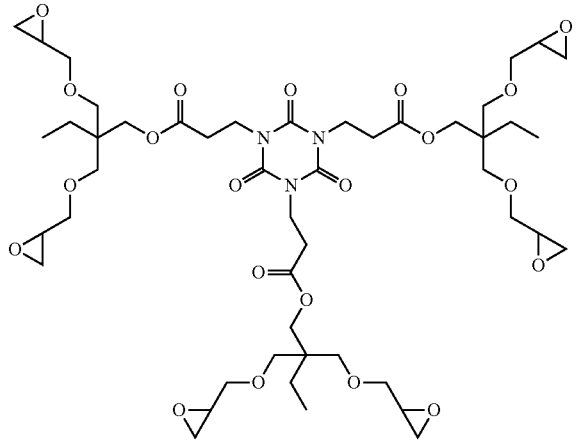

<Curing Agent (C)>

C1: CPI®-210S (manufactured by San-Apro Ltd.)

<Oxetane Compound (D)>

D1: ETERNACOLL® OXBP (manufactured by Ube Industries, Ltd., represented by the following General Formula (9))

General Formula (9)

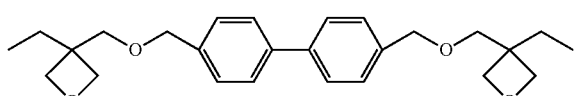

D2: OXT-221 (manufactured by TOAGOSEI CO., LTD., represented by the following General Formula (10))

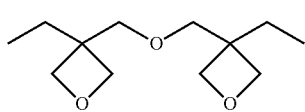

General Formula (10)

D3: OXT-101 (manufactured by TOAGOSEI CO., LTD., represented by the following General Formula (11))

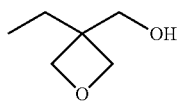

General Formula (11)

<Cation-Polymerizable Compound (E)>

E1: 2,2-bis(4-glycidyloxyphenyl)propane which is an epoxy resin (manufactured by Tokyo Chemical Industry Co., Ltd., represented by the following General Formula (12))

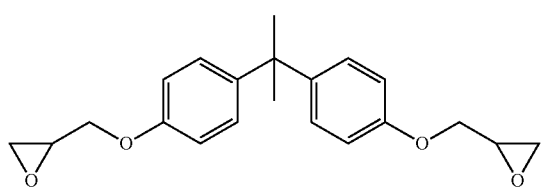

General Formula (12)

E2: jER® 806 which is an epoxy resin (manufactured by Mitsubishi Chemical Corporation, represented by the following General Formula (13))

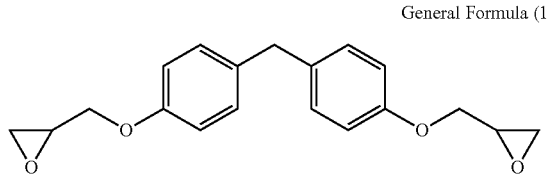

General Formula (13)

[Preparation of Curable Resin Composition]

Each component was combined in combination ratios shown in Tables 2 and 3, heated to 75° C., and stirred with a stirring apparatus for 2 hours to obtain a curable resin composition. The combination ratios in Tables 1 and 2 are expressed in a parts by mass.

[Preparation of Specimen]

From the prepared curable resin composition, a cured product was created by the following method. First, a mold having a length of 80 mm, a width of 10 mm, and a thickness of 4 mm was interposed between two sheets of quartz glass, and the curable resin composition was flowed thereinto. The flowed curable resin composition was irradiated with an ultraviolet ray at 5 mW/cm² from both surfaces of the mold for 120 seconds, with an ultraviolet ray irradiator (manufactured by HOYA CANDEO OPTRONICS, product name: 'LIGHT SOURCE EXECURE3000'), thereby performing pre-curing. Thereafter, the ultraviolet ray was emitted again for 600 seconds for each time from the both surfaces to perform main curing, thereby obtaining a cured product (total energy of 7200 mJ/cm²). The thus-obtained cured product was heat-treated in a heating oven at 50° C. for 1 hour, and a heating oven at 100° C. for 2 hours, thereby obtaining a specimen having a length of 80 mm, a width of 10 mm, and a thickness of 4 mm.

[Evaluation]

(Charpy Impact Strength)

For the specimen, like the first embodiment, Charpy impact strength was calculated according to JIS K 7111, and used as an indicator of toughness. The obtained results are shown in Tables 2 and 3.

(Deflection Temperature Under Load)

For the specimen, according to JIS K 7191-2, the specimen was heated, using a deflection temperature under load tester (manufactured by Toyo Seiki Seisaku-sho, Ltd., product name: 'No. 533 HDT test equipment 3M-2') at a bending stress of 1.80 MPa, from room temperature with a rate of 2° C./min. A temperature at which a deflection quantity of the specimen reached 0.34 mm is defined as a deflection temperature under load, and used as an indicator of thermal resistance. The obtained results are shown in Tables 2 and 3.

(Crosslinking Density)

Crosslinking density was obtained by calculation based on the combination ratio with the density of each component of 1 g/cm³, from the molecular weight and the number of the reactive group of each component. A calculating method of the crosslinking density is as follows: when an epoxy group, an oxetanyl group and a cycloalkene oxide group are polymerized, two molecular chains are branched from the reactive group by the polymerization. Thus, since the two molecular chains have this one molecule as a crosslink, and one molecular chain is shared with the other one molecule (crosslinking point), the crosslinking density is calculated by conversion into a half of (the reactive group×2). The number of the branched chains produced from one molecule is the number of the reactive groups×2. Therefore, when calculating crosslinking density, the crosslinking density was calculated from an equation of (the number of reactive groups× 2)/2/(molecular weight). Values obtained by multiplying the crosslinking density calculated by the method for each material which was combined by a combination ratio were integrated for all materials, and the crosslinking density of the final cured product was defined as the crosslinking density. In addition, since a molecule having only one reactive group does not occur branching, calculation was performed with the reactive group equal to 0.

TABLE 2

| | | Examples | | | | | | | | | | | |
|---|---|---|---|---|---|---|---|---|---|---|---|---|---|
| | | 6 | 7 | 8 | 9 | 10 | 11 | 12 | 13 | 14 | 15 | 16 | 17 |
| Composition | A1 | 70 | 70 | 70 | 70 | 70 | 70 | 70 | 70 | 70 | 50 | 80 | 90 |
| | BII-1 | 10 | 20 | 10 | 20 | 30 | — | — | — | — | 34 | 14 | 7 |
| | BII-2 | — | — | — | — | — | 10 | 20 | — | — | — | — | — |
| | BII-3 | — | — | — | — | — | — | — | 20 | 20 | — | — | — |

TABLE 2-continued

| | | Examples | | | | | | | | | | | |
|---|---|---|---|---|---|---|---|---|---|---|---|---|
| | | 6 | 7 | 8 | 9 | 10 | 11 | 12 | 13 | 14 | 15 | 16 | 17 |
| | C1 | 2 | 2 | 2 | 2 | 2 | 2 | 2 | 2 | 2 | 2 | 2 | 2 |
| | D1 | — | — | 20 | 10 | — | — | — | — | 10 | — | — | — |
| | D2 | 20 | 10 | — | — | — | 20 | 10 | 10 | — | 16 | 6 | 3 |
| | D3 | — | — | — | — | — | — | — | — | — | — | — | — |
| | E1 | — | — | — | — | — | — | — | — | — | — | — | — |
| | E2 | — | — | — | — | — | — | — | — | — | — | — | — |
| Evaluation | Charpy impact strength [kj/m$^2$] | 4 | 4.3 | 5.2 | 4.1 | 4 | 4 | 4.7 | 2.9 | 3 | 0.7 | 4.3 | 5.2 |
| | deflection temperature under load [° C.] | 93 | 100 | 89 | 100 | 97 | 93 | 100 | 84 | 82 | 119 | 100 | 79 |
| | crosslinking density [mol/cm$^3$] | 4127 | 3699 | 3231 | 3251 | 3270 | 4409 | 4262 | 3852 | 3404 | 4496 | 3300 | 2902 |

TABLE 3

| | | Comparative Examples | | | | | | | | | |
|---|---|---|---|---|---|---|---|---|---|---|---|
| | | 3 | 4 | 5 | 6 | 7 | 8 | 9 | 10 | 11 | 12 |
| Composition | A1 | 70 | 90 | 50 | 50 | 70 | 70 | 70 | 100 | — | — |
| | B1 | — | — | — | — | — | — | — | — | — | — |
| | B2 | — | — | — | — | — | — | — | — | — | — |
| | B3 | — | — | — | — | — | — | — | — | — | — |
| | C1 | 2 | 2 | 2 | 2 | 2 | 2 | 2 | 2 | 2 | 2 |
| | D1 | — | — | — | — | — | — | — | — | — | — |
| | D2 | — | — | — | 50 | 30 | 20 | 25 | — | — | — |
| | D3 | 30 | 10 | 50 | — | — | 10 | 5 | — | — | — |
| | E1 | — | — | — | — | — | — | — | — | 100 | — |
| | E2 | — | — | — | — | — | — | — | — | — | 100 |
| Evaluation | Charpy impact strength [kj/m$^2$] | 11.1 | 7.3 | 5.2 | 1.6 | 2.6 | 8.2 | 10.1 | 7.5 | 0.8 | 1.1 |
| | deflection temperature under load [° C.] | 47 | 55 | 38 | 82 | 75 | 52 | 48 | 64 | 71 | 66 |
| | crosslinking density [mol/cm$^3$] | 1752 | 2253 | 1252 | 5924 | 4556 | 3621 | 4089 | 2503 | 5882 | 6410 |

The cured products obtained from the resin compositions of the present invention represented in Examples 6 to 17 had an excellent balance of toughness and thermal resistance, as compared with the cured products obtained from the compositions which did not include the component (BII), represented in Comparative Examples 3 to 10, and thus, are preferred for obtaining the effect of the present invention. In addition, the cured product obtained from the resin composition of the present invention, represented in Example 5, had much better toughness and thermal resistance, as compared with the cured products of the epoxy resin (E), represented in Comparative Examples 11 and 12.

Figure 2:
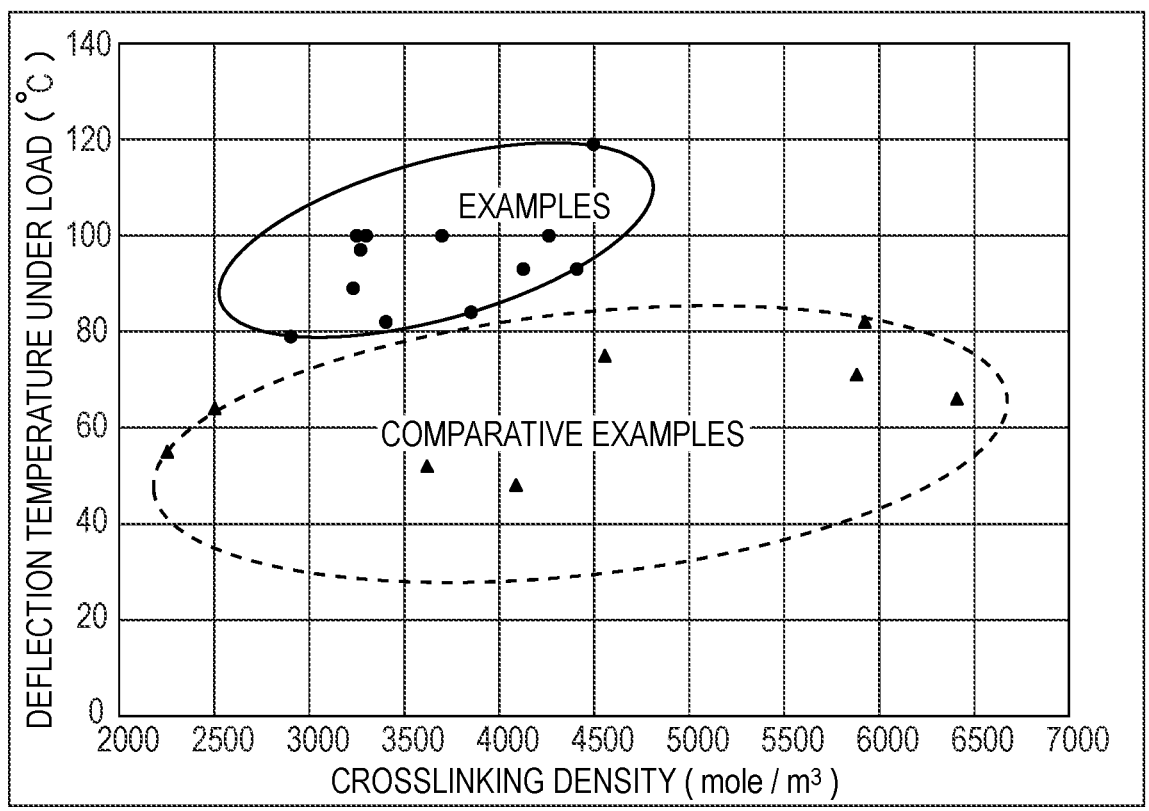
FIG. 2 is a graph representing a relationship between crosslinking density (calculated value) and a deflection temperature under load.

The results of the crosslinking density and the Charpy impact strength are shown in FIG. 1, in which the Examples are plotted as ●, and the Comparative Examples are plotted as ♦. As shown in FIG. 1, a correlation between the crosslinking density and the Charpy impact strength was shown, and it was found that when the crosslinking density was determined, the Charpy impact strength was almost as expected. Meanwhile, the results of the crosslinking density and the deflection temperature under load are shown in FIG. 2, in which the Examples are plotted as ●, and the Comparative Examples are plotted as ♦. Usually, in the cured product of the epoxy resin, when the deflection temperature under load is expected to be within the range of the results of the Comparative Examples (♦) from the calculated value of the crosslinking density. However, the cured product obtained from the curable resin composition of the present invention had a deflection temperature under load of the Example (●), which was beyond the expectable range, and thus, it was found that a cured product having an excellent deflection temperature under load was obtained. As a result, it is clear that the curable resin composition of the present invention unexpectedly has an effect of compatibility between excellent thermal resistance and excellent toughness.

From the above results, it is clear that the curable resin composition of the present invention has an excellent effect of compatibility between toughness and thermal resistance, thereby being preferably used in optical three-dimensional shaping.

Third Embodiment

The curable resin composition according to a third embodiment includes:
(A) a curable resin represented by the following General Formula (1):

General Formula (I)

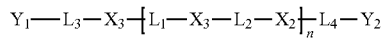

where
$X_1$ and $X_2$ are independently of each other a divalent linking group containing an aromatic ring,
$X_3$ is an alkylene group having 4 to 18 carbon atoms, in which a carbon atom forming the alkylene group may be substituted by an oxygen atom, a sulfur atom, a nitrogen atom, or a silicon atom,
$L_1$, $L_2$, $L_3$, and $L_4$ are independently of one another a divalent linking group containing one or more bonds selected from the group consisting of —O—, —C—O—, —S—, —C—S—, an ester bond, a urethane bond, an ether bond, a thiourethane bond, and a thioether bond,
$Y_1$ and $Y_2$ are independently of each other an epoxy group, a cycloalkene oxide group, or an oxetanyl group, and
n is an average value of repeating structural units, and a real number of 0.1 or more and 10 or less;
(BIII) an oxetane compound represented by the following General Formula (2):

General Formula (2)

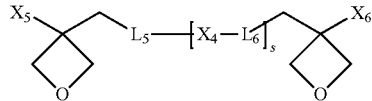

where
$X_4$ is a divalent linking group which is linked by a carbon atom forming an aromatic ring,
$X_5$ and $X_6$ are independently of each other a hydrogen atom or an alkyl group having 1 to 6 carbon atoms,
$L_5$ and $L_6$ are independently of each other a divalent linking group containing a bond selected from the group consisting of —O—, —C—O—, an ester bond, and an ether bond, and
s is an average value of repeating structural units, and a real number of 0.1 or more and 10 or less; and
(C) a curing agent,
a mass ratio of the curable resin (A) to the oxetane compound (BIII) being 5:5 to 9:1.

<Curable Resin (A)(Component (A))>

As the curable resin (A) used in the present embodiment, the curable resin (A) described in the first embodiment can be used. The preparation method of the curable resin (A) also follows the preparation method of the curable resin (A) of the first embodiment.

From the viewpoint of improving toughness of a cured product, the curable resin (A) is included so that a mass ratio of the component (A) to the component (BIII) is 5:5 to 9:1, preferably 7:3 to 9:1. That is, the content of the curable resin (A) is 50 parts by mass or more and 90 parts by mass or less, and preferably 70 parts by mass or more and 90 parts by mass or less, based on total 100 parts by mass of the component (A) and the component (BIII).

<Oxetane Compound (BIII) (Component (BIII))>

An oxetane compound (BIII) is a compound having at least two oxetanyl groups represented by the following General Formula (2), described in the first embodiment, and is polymerized by the curing agent (C) as described below:

General Formula (2)

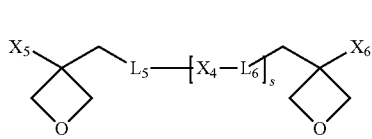

The oxetane compound (BIII) may be composed of only one kind of oxetane compound, or plural kinds of oxetane compounds.

The number of oxetanyl groups of the oxetane compound (BIII) is not particularly limited. The oxetane compound (BIII) can be used by appropriately selecting one among the compounds described as the oxetane compound represented by General Formula (2) in the first embodiment.

From the viewpoint of improving toughness of the cured product, the curable resin (A) is included so that a mass ratio of the component (A) to the component (BIII) is 5:5 to 9:1, and preferably 7:3 to 9:1. That is, the content of the oxetane compound (BIII) is 10 parts by mass or more and 50 parts by mass or less, and preferably 10 parts by mass or more and 30 parts by mass or less, based on total 100 parts by mass of the component (A) and the component (BIII).

<Curing Agent (C) (Component (C))>

As a curing agent (C), a cation-polymerizable initiator such as a photoacid generator, a photobase generator, and a thermal acid generator can be used. To the extent that the effect of the present invention is not impaired, the curing agents may be used alone or in combination of two or more. When a three-dimensional shaped article is formed by photocuring, it is preferred to use the photoacid generator or the photobase generator, due to the stability over time of the curable resin composition of the present invention, or the restriction of a three-dimensional shaping method, and it is particularly preferred to use the photoacid generator. In addition, as the curing agent (C), other curing agents such as a radical polymerization initiator, for example, a thermal latent curing agent may be included.

[Cationic Polymerization Initiator]
(Photoacid Generator)

A photoacid generator is a photocation-polymerizable initiator which generates an acid capable of initiating cationic polymerization by irradiation of an energy rays such as an ultraviolet ray. When the photoacid generator is used as a curable resin for three-dimensional shaping, it is preferred to use the photocation-polymerizable initiator.

The photocation-polymerizable initiator can be used by appropriately selecting one among the photocation-polymerizable initiators described as the photoacid generator in the first embodiment.

The added amount of the photoacid generator is preferably 0.1 parts by mass or more and 15 parts by mass or less, and more preferably 0.1 parts by mass or more and 10 parts by mass or less, based on total 100 parts by mass of the component (A) and the component (BIII). When the amount of the photoacid generator is small, polymerization tends to be insufficient. When the amount of the initiator is large, a light transmittance is lowered, and polymerization may become heterogeneous.

(Photobase Generator)

A photobase generator can be used by appropriately selecting one from the photocation-polymerizable initiators described as the photobase generator in the first embodiment.

The added amount of the photobase generator is preferably 0.1 parts by mass or more and 15 parts by mass or less, and more preferably 0.1 parts by mass or more and 10 parts by mass or less, based on total 100 parts by mass of the component (A) and the component (BIII). When the amount of the photobase generator is small, polymerization tends to be insufficient.

(Thermal Acid Generator)

A thermal acid generator can be also used by appropriately selecting one among the photocation-polymerizable initiators described as the thermal acid generator in the first embodiment.

The added amount of the thermal acid generator is preferably 0.1 parts by mass or more and 15 parts by mass or less, and more preferably 0.1 parts by mass or more and 10 parts by mass or less, based on total 100 parts by mass of the component (A) and the component (BIII). When the amount of the thermal acid generator is small, polymerization tends to be insufficient.

[Radical Polymerization Initiator]

When the curable resin composition according to the present embodiment particularly includes a radical polymerizable compound (F) to be described below, a radical polymerization initiator may be included. In the present embodiment also, the radical polymerization initiator which is identical to that of the first embodiment can be used.

The added amount of the photoradical polymerization initiator is preferably 0.1 parts by mass or more and 15 parts by mass or less, and more preferably 0.1 parts by mass or more and 10 parts by mass or less, based on 100 parts by mass of the radical polymerizable compound (F). When the amount of the photoradical polymerization initiator is small, polymerization tends to be insufficient. When the amount of the initiator is large, a light transmittance is lowered, and polymerization may become heterogeneous.

The added amount of the thermal radical polymerization initiator is preferably 0.1 parts by mass or more and 15 parts by mass or less, and more preferably 0.1 parts by mass or more and 10 parts by mass or less, based on 100 parts by mass of the radical polymerizable compound (F). When the polymerization initiator is added in excess, the molecular weight is not increased, and the physical properties may be deteriorated.

[Other Curing Agents]

As the curing agent (C), a thermal latent curing agent described in the first embodiment may be used.

The added amount of other curing agents is preferably 0.1 parts by mass or more and 75 parts by mass or less, and more preferably 5 parts by mass or more and 30 parts by mass or less, based on total 100 parts by mass of the component (A) and the component (BIII). When the amount of the thermal latent polymerization initiator is small, polymerization tends to be insufficient, and when the amount is too large, a crosslinking reaction tends to proceed, causing deterioration of toughness.

<Cation-Polymerizable Compound (E) (Component (E))>

The curable resin composition of the present embodiment may include, for example, an epoxy resin, an oxetane compound, or the like, as a cation-polymerizable compound other than component (A) and the component (BIII).

[Epoxy Resin]

An epoxy resin which may be used as an epoxy resin other than the component (A) used in the present invention, and a preferred epoxy resin are identical to those of the first embodiment.

[Oxetane Compound]

An oxetane compound used in the present invention in addition to the component (A) and the component (B) may include an oxetane compound having one oxetanyl group, an oxetane compound having two or more oxetanyl groups and no aromatic ring, or the like. The oxetane compound may be composed of only one kind of oxetane compound, or plural kinds of oxetane compounds. The oxetane compound is not particularly limited as long as it has an oxetanyl group.

A specific example of the oxetane compound may include monooxetane compounds such as 3-ethyl-3-[(2-ethylhexyloxy)methyl]oxetane, 3-ethyl-3-hydroxymethyloxetane, 3-ethyl-3-(4-hydroxybutyl)oxymethyloxetane, 3-ethyl-3-hexyloxymethyloxetane, 3-ethyl-3-allyloxymethyloxetane, 3-ethyl-3-benzyloxymethyloxetane, 3-ethyl-3-methacryloxymethyloxetane, 3-ethyl-3-carboxyoxetane, and 3-ethyl-3-phenoxymethyloxetane; dioxetane compounds such as bis[1-ethyl(3-oxetanyl)]methylether, bis[(ethyl(3-oxetanyl)]methyl carbonate, bis[ethyl(3-oxetanyl)]ethyl adipic acid, bis[ethyl(3-oxetanyl)]methyl 1,4-cyclohexane carboxylate, and $\alpha,\omega$-bis-{3-[1-ethyl(3-oxetanyl)methoxy]propyl} (polydimethylsiloxane); and polyvalent oxetane compounds such as oligo(glycidyloxetane-co-ethylglycidylether), but is not limited thereto.

Among them, 3-ethyl-3-[(2-ethylhexyloxy)methyl]oxetane, 3-ethyl-3-hydroxymethyloxetane, 3-ethyl-3-(4-hydroxybutyl)oxymethyloxetane, bis[1-ethyl(3-oxetanyl)]methylether are preferred, since they have low viscosity and is easily handled, simultaneously with representing high reactivity.

As the oxetane compound, a commercially available product having a cation-polymerizable monomer as a main component may be used, and for example, ARON OXETANE® OXT-221, EXOH, OXA, OXT-101, OXT-212 (manufactured by TOAGOSEI CO., LTD.), ETERNACOLL® OXTP (manufactured by Ube Industries, Ltd.), or the like may be included.

[Content of Cation-Polymerizable Compound (E)]

The content of a cation-polymerizable compound (E) is preferably 0.1 parts by mass or more and 75 parts by mass or less, and more preferably 5 parts by mass or more and 30 parts by mass or less, based on total 100 parts by mass of the component (A) and the component (BIII).

<Radical Polymerizable Compound (F) (Component (F))>

The curable resin composition of the present embodiment may include a compound described as the component (F) in the first embodiment, or the like, as a radical polymerizable compound (F).

For expressing the effect of the present invention, the content of the radical polymerizable compound (F) is preferably 0 parts by mass or more and 75 parts by mass or less, based on total 100 parts by mass of the component (A) and the component (BIII). When the amount of the radical polymerizable compound (F) is in excess, the effect of the present invention may be impaired.

<Other Components>

The curable resin composition of the present embodiment may include various additives as other optional components, to the extent that the object and effect of the present invention are not impaired. Such additives are identical to "other components" in the second embodiment.

<Curable Resin Composition>

The composition of the present invention can be prepared by placing the essential components (A), (BIII), and (C), and if necessary, other optional components in appropriate amounts in a stirring container, and stirring them usually at 30° C. or more and 120° C. or less, and preferably 50° C. or more and 100° C. or less. A stirring time herein is usually 1 minute or more and 6 hours or less, and preferably 10 minutes or more and 2 hours or less. The content of the sum of the component (A) and the component (BIII) is preferably 1 part by mass or more and 100 parts by mass or less, more preferably 25 parts by mass or more and 100 parts by mass or less, and still more preferably 75 parts by mass or more and 100 parts by mass or less, based on 100 parts by mass of the curable resin composition except the component (C), thereby sufficiently obtaining the effect of the present invention.

The viscosity of the composition of the present invention at 25° C. is preferably 50 Pa·s or more and 10,000 mPa·s or less, and more preferably 70 mPa·s or more and 5,000 mPa·s or less.

The thus-obtained composition of the present invention is preferably used as a photocurable resin composition in a method of optically forming a three-dimensional shaped article. That is, a three-dimensional shaped article having a desired shape can be manufactured by a method of optically forming a three-dimensional shaped article, in which the photocurable resin composition of the present invention is selectively irradiated with an active energy ray such as an ultraviolet ray, an electron beam, an X-ray, and a radiation to supply energy required or curing.

<Cured Product>

The composition of the present invention includes the curable resin (A), the oxetane compound (BIII), and the curing agent (C), as essential components, and by curing the components, a cured product can be obtained. A curing method may be any known method such as active energy ray curing or thermal curing, depending on a curing agent included therein. The curing method may be a combination of two or more.

<Function of Curable Resin Composition>

The curable resin composition of the present invention is cured by applying external energy to form a cured product. Here, a cationic polymerization reaction of the curable resin (A) and the oxetane compound (BIII) is initiated by an acid generated by the curing agent (C) to proceed with curing of the curable resin composition. Here, even for increasing the curability and thermal resistance property of the cured product, it is preferred that the crosslinking density in the cured product is high. However, since the crosslinking point in the cured product is physically fixed, when the crosslinking density is increased too much, toughness is significantly lowered, and the product becomes brittle. Meanwhile, the curable resin composition according to the present embodiment necessarily includes an aromatic ring in the molecular backbone of the curable resin (A) and the oxetane compound (BIII). Thus, a weak interaction of aromatic rings between the molecules of the curable resin (A) and the oxetane compound (BIII), so called, π-π stacking functions, thereby contributing improvement in curability and thermal resistance like the crosslinking point. As a result, the resin composition of the present invention can obtain the cured product having higher toughness than the conventional curable resin composition, while maintaining equivalent thermal resistance to the conventional composition.

The curable resin composition of the present invention includes the photoacid generator or the photobase generator as the curing agent (C), thereby being preferably used in an optical three-dimensional shaping method.

EXAMPLES

Hereinafter, the Examples will be described for describing the present invention in detail, but the present invention is not limited to the Examples.

Example 18

Each component was combined according to the following prescription, heated to 75° C., and stirred for 2 hours with a stirring apparatus, thereby preparing a curable resin composition.

Component (A): 90.0 parts by mass of a curable resin A-i (n=1)
Component (BIII): 10.0 parts by mass of an oxetane compound B-iv
Component (C): 2.0 parts by mass of a photoacid generator 'CPI-210S' (manufactured by San-Apro Ltd.)

[Preparation of Specimen]

From the prepared curable resin composition, a specimen having a length of 80 mm, a width of 10 mm, and a thickness of 4 mm was obtained by the same method as that of the second embodiment.

[Evaluation]
(Charpy Impact Strength)

For the specimen, like the first embodiment, Charpy impact strength was calculated according to JIS K 7111, and used as an indicator of toughness. The obtained result are shown in Table 4.

(Deflection Temperature Under Load)

For the specimen, like the second embodiment, a deflection temperature under load was measured according to JIS K 7191-2, and used as an indicator of thermal resistance. The obtained results are shown in Table 4.

Examples 18 to 24, and Comparative Examples 13 to 18

Curable compositions were prepared in the same manner as in Example 1, except that the types and contents of component (A) and component (BIII) were changed as shown in Table 1, and evaluation was performed in the same manner as in Example 1. The results are shown in Table 4.

In addition, 'EX-991L' (manufactured by Nagase ChemteX Corporation) used as the component (A) in Comparative Example 15 is an epoxy resin having no aromatic ring in the molecular backbone, and the molecular structure thereof is represented by the following (C-i). In the formula, z refers to repetition (z=14 to 15). In addition, 'OXT-221' (manufactured by TOAGOSEI CO., LTD.) used as the component (BIII) in Comparative Examples 17 and 18 is an oxetane compound having no aromatic ring in the molecular backbone, and the molecular structure thereof is represented by the following (C-ii):

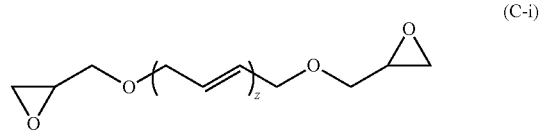
(C-i)

-continued

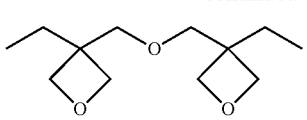

(C-ii)

TABLE 4

|  | Component (A) | | Component (B) | | Charpy impact strength (KJ/m²) | Deflection temperature under load (° C.) |
|---|---|---|---|---|---|---|
|  | Type | Content ratio [part by mass] | Type | Content ratio [part by mass] | | |
| Example 18 | A-i | 90.0 | B-iv | 10.0 | 8.2 | 61 |
| Example 19 | A-i | 70.0 | B-ii | 30.0 | 5.9 | 67 |
| Example 20 | A-i | 70.0 | B-iii | 30.0 | 7.1 | 60 |
| Example 21 | A-i | 70.0 | B-iv | 30.0 | 5.5 | 74 |
| Example 22 | A-i | 50.0 | B-iv | 50.0 | 4.0 | 83 |
| Example 23 | A-v | 70.0 | B-ii | 30.0 | 4.3 | 62 |
| Example 24 | A-v | 70.0 | B-iv | 30.0 | 4.1 | 64 |
| Comparative Example 13 | A-i | 95.0 | B-iv | 5.0 | 10.8 | 50 |
| Comparative Example 14 | A-i | 40.0 | B-iv | 60.0 | 1.4 | 98 |
| Comparative Example 15 | EX-991L | 70.0 | B-iv | 30.0 | 15.3 | 31 |
| Comparative Example 16 | Bisphenol A type diglycidyl ether | 70.0 | B-iv | 30.0 | 1.1 | 92 |
| Comparative Example 17 | A-i | 70.0 | OXT221 | 30.0 | 2.4 | 75 |
| Comparative Example 18 | A-v | 70.0 | OXT221 | 30..0 | 1.9 | 75 |

As shown in Table 1, all of Examples 18 to 24 according to the present invention had Charpy impact strength of 4.0 KJ/m² or more and a deflection temperature under load of 60° C. or more, and compatibility between good toughness and thermal resistance. In addition, there was a preferred range of the ratio of the curable resin (A) and the oxetane compound (BIII), and Comparative Examples 13 and 14 which is out of the preferred range exceeded only a target value of one of toughness and thermal resistance.

In addition, Comparative Examples 14 to 17 did not have compatibility between toughness and thermal resistance, even within the preferred range of the combination ratio of the curable resin (A) and the oxetane compound (BIII). It was confirmed therefrom that toughness and thermal resistance can be improved by having an aromatic ring and an alkylene group in the molecular structure of the curable resin (A), and an aromatic ring in the molecular structure of the oxetane compound (BIII), that is, by expressing a weak intermolecular interaction (π-π stacking) in the cured product.

<Use>

The uses of the curable resin composition according to the present invention and the cured product thereof are not particularly limited. For example, the composition and the cured product thereof may be used for various applications such as resins for a 3D printer of an optical shaping method, sporting goods, medical/nursing care supplies, industrial machinery and equipment, precision equipment, electric/electronic equipment, electric/electronic parts, and building material supplies.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A method of manufacturing a three-dimensional shaped article, comprising the steps of:
    preparing a curable resin composition that comprises a first component, a second component and a curing agent;
    forming a first layer of the curable resin composition;
    photocuring the first layer of the curable resin composition based on a first slice data to shape a first part of the shaped article;
    forming a second layer of the curable resin composition;
    photocuring the second layer of the curable resin composition based on a second slice data to shape a second part of the shaped article; and
    removing a part of the curable resin composition from a surface of a cured product including the first part and the second part, wherein
    the second component is an oxetane compound, and
    the first component is represented by formula (1)

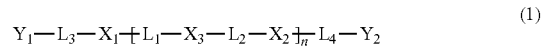

(1)

where $X_1$ and $X_2$ are independently a divalent linking group containing an aromatic ring, $L_1$, $L_2$, $L_3$ and $L_4$ are independently a divalent linking group containing one or more bonds selected from the group consisting of —O—, —C—O—, —S—, —CS—, an ester bond, a urethane bond, an ether bond, a thiourethane bond and a thioether bond, $Y_1$ and $Y_2$ are independently an epoxy group, a cycloalkene oxide group or an oxetanyl group, n is an average value of repeating structural units and is a real number of 0.1 to 10, and $X_3$ is represented by formula (1-VIII)

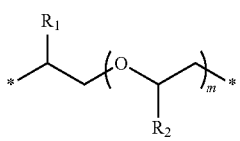
(1-VIII)

where m is an integer selected so that the alkylene group has 4 to 18 carbon atoms, $R_1$ and $R_2$ are hydrogen or a methyl group, and

* denotes a bond to $L_1$ or $L_2$.

2. The method according to claim 1, wherein the curable resin composition further comprises a cyclic compound.

3. The method according to claim 2, wherein the cyclic compound has an epoxy group as a reactive group.

4. The method according to claim 2, wherein the cyclic compound has 3 to 6 reactive groups and a reactive group equivalent of 100 g/eq to 300 g/eq.

5. The method according to claim 2, wherein the cyclic compound has 1 to 6 cyclic structures selected from the group consisting of isocyanurate rings and aromatic rings.

6. The method according to claim 1, wherein a viscosity of the curable resin composition at 25° C. is 50 to 10,000 mPa·s.

7. The method according to claim 1, wherein the second component is an oxetane compound represented by formula (2)

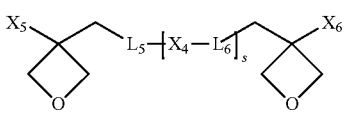
(2)

where $X_4$ is a divalent linking group, which is linked by a carbon atom forming an aromatic ring, $X_5$ and $X_6$ are independently a hydrogen atom or an alkyl group having 1 to 6 carbon atoms, $L_5$ and $L_6$ are independently a divalent linking group containing a bond selected from the group consisting of —O—, —C—O—, an ester bond, and an ether bond, and s is an average value of repeating structural units and is a real number of 0.1 to 10.

8. The method according to claim 7, wherein the curable resin composition comprises a third component, which is a cation-polymerizable compound.

9. The method according to claim 8, wherein the third component contains an epoxy resin or an oxetane compound.

10. The method according to claim 7, wherein $X_4$ is a phenylene group, a biphenylene group, a naphthalenediyl group, an anthracenediyl group, a phenanthrenediyl group, a fluorenediyl group, a diphenylmethanediyl group, a diphenylethanediyl group, a diphenylpropanediyl group, a diphenyletherdiyl group, a diphenylsulfonediyl group, a triphenylethanediyl group or a tetraphenylmethanediyl group, which is optionally substituted.

11. The method according to claim 1, wherein the second component is a cation-polymerizable compound.

12. The method according to claim 1, wherein the curable resin composition comprises a polyhydric alcohol having 2 to 5 hydroxyl groups.

13. The method according to claim 12, wherein the polyhydric alcohol has a molecular weight of 1,000 or less.

14. The method according to claim 1, wherein the oxetane compound is represented by formula (4)

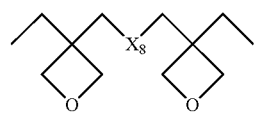
(4)

where $X_8$ is a dihydric alcohol residue, or a divalent linking group containing one or more bonds selected from the group consisting of —O—, —C—O—, an ether bond, a carbonate bond, a urethane bond and a urea bond, and may optionally contain an aromatic ring.

15. The method according to claim 1, wherein n is 0.2 to 5.

16. The method according to claim 1, wherein $X_1$ and $X_2$ are independently a phenylene group, a biphenylene group, a naphthalenediyl group, an anthracenediyl group, a phenanthrenediyl group, a fluorenediyl group, a diphenylmethanediyl group, a diphenylethanediyl group, a diphenylpropanediyl group, a diphenyletherdiyl group, or a diphenylsulfonediyl group, which is optionally substituted.

17. The method according to claim 1, wherein $X_3$ is an optionally substituted acyclic alkylene group having a straight chain or a branched chain structure.

18. The method according to claim 1, wherein $L_1$, $L_2$, $L_3$ and $L_4$ independently contain a bond selected from the group consisting of —O—, —C—O—, —S—, —C—S—, an ether bond and a thioether bond.

19. The method according to claim 1, wherein $Y_1$ and $Y_2$ are an epoxy group.

20. The method according to claim 1, wherein the curing agent is a photoacid generator.

21. The method according to claim 1, wherein the oxetane compound has two oxetanyl groups.

* * * * *